(12) United States Patent
Nakamura

(10) Patent No.: US 8,229,805 B2
(45) Date of Patent: Jul. 24, 2012

(54) PRODUCT INFORMATION MANAGEMENT SYSTEM AND PRODUCT INFORMATION MANAGEMENT METHOD

(75) Inventor: Jinichi Nakamura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 389 days.

(21) Appl. No.: 12/562,476

(22) Filed: Sep. 18, 2009

(65) Prior Publication Data

US 2010/0076872 A1    Mar. 25, 2010

(30) Foreign Application Priority Data

Sep. 25, 2008  (JP) .................................. 2008-246483

(51) Int. Cl.
*G06Q 10/00* (2012.01)
(52) U.S. Cl. .............................. 705/28; 705/29; 235/385
(58) Field of Classification Search ........................ None
See application file for complete search history.

(56) References Cited

U.S. PATENT DOCUMENTS

| | | | |
|---|---|---|---|
| 7,046,148 B2 | 5/2006 | Miyazawa | |
| 2005/0258228 A1* | 11/2005 | Rommelmann et al. | 235/375 |
| 2006/0010503 A1 | 1/2006 | Inoue et al. | |
| 2006/0132311 A1* | 6/2006 | Kruest et al. | 340/572.4 |
| 2006/0255130 A1 | 11/2006 | Whewell et al. | |
| 2008/0217404 A1* | 9/2008 | Adstedt et al. | 235/385 |

FOREIGN PATENT DOCUMENTS

| | | |
|---|---|---|
| JP | 2004-217426 | 8/2004 |
| JP | 2004-252621 | 9/2004 |
| JP | 2006-525574 | 11/2006 |

OTHER PUBLICATIONS

"Inside Contactless and HID Corporation Expand Partnership for Advanced Access Control Development Solutions", PR Newswire, Dec. 6, 2005. p. 1.*

* cited by examiner

*Primary Examiner* — M. Thein

(57) ABSTRACT

Information recorded to a tag device can be used effectively. A terminal device 30 has an input receiving unit (interface unit 40*h*) that accepts input of information recorded on a tag device 50, a query unit (CPU 40*f*) that sends input information to the server device and requests verification of the validity of the product, and a presentation unit (display unit 40*g*) that presents information that is transmitted when the validity of the product is verified. The server device has a recording unit (hard disk drive 10*b*) that records information related to the product, a verification unit (CPU 10*e*) that determines validity when the terminal device requests verification of product validity, and a transmission unit (10*g*) that acquires and sends the corresponding information recorded in the recording unit to the terminal device when validity is verified.

15 Claims, 18 Drawing Sheets

| MANUFACTURER | ABC |
|---|---|
| PRODUCT NAME | DEF |
| PRODUCTION SITE | ABC12345 |
| LOT NUMBER | DEF54321 |
| PRODUCT NUMBER | 2343 |

FIG. 11A

| ID | AREA NUMBER | RECORDING FREQUENCY | PASS CHECK |
|---|---|---|---|
| 00000 | 0 | 24h | 0 |
| 11111 | 1 | 1h | 0 |
| 22222 | 2 | 24h | 0 |
| 33333 | 3 | 168h | 0 |
| 44444 | 4 | 1h | 0 |
| 55555 | 5 | 24h | 0 |
| 66666 | 6 | 168h | 0 |

FIG. 11B

| AREA | DATE/TIME OF MEASUREMENT | TEMPERATURE |
|---|---|---|
| 0 | FST:2008/11/20 5:21 | 13.5 |
| | FST:2008/11/21 5:21 | 13.0 |
| | ⋮ | ⋮ |
| | FST:2008/12/20 5:21 | 13.0 |
| | EOF | EOF |
| 1 | FF | FF |
| | FF | FF |
| | ⋮ | ⋮ |
| | FF | FF |
| ⋮ | ⋮ | ⋮ |
| 6 | FF | FF |
| | FF | FF |
| | ⋮ | ⋮ |
| | FF | FF |

FIG. 12

| PRODUCTION INFORMATION | MANUFACTURER | ABC | |
|---|---|---|---|
| | PRODUCT NAME | DEF | |
| | PRODUCTION SITE | ABC12345 | |
| | LOT NUMBER | DEF54321 | |
| | PRODUCT NUMBER | 2343 | |
| DISTRIBUTION INFORMATION | AREA | PASS CHECK | |
| | 0 | 1 | |
| | 1 | 1 | |
| | ⋮ | ⋮ | |
| | 6 | 1 | |
| HANDLING INFORMATION | AREA | DATE/TIME OF MEASUREMENT | TEMPERATURE |
| | 0 | FST:2008/11/20 5:21 | 13.5 |
| | | ⋮ | ⋮ |
| | | EOF | EOF |
| | ⋮ | ⋮ | ⋮ |
| | 6 | JT:2008/12/15 14:21 | 13.2 |
| | | ⋮ | ⋮ |
| | | EOF | EOF |
| QUALITY INFORMATION | quality.html | | |
| ADVICE INFORMATION | advice.html | | |

FIG. 13

| PRODUCT NAME | DEF |
|---|---|
| TOTAL PRODUCTION | 5632 |
| QUANTITY IN DISTRIBUTION CHANNELS | 1233 |
| QUANTITY HELD BY CONSUMERS | 1567 |

FIG. 16A

CERTIFICATE OF WINE QUALITY

THE QUALITY OF THIS PRODUCT IS CERTIFIED AS FOLLOWS.

MANUFACTURER : ABC

NAME OF PRODUCT : DEF

PRODUCED AT : ABC12345

PRODUCT NUMBER : DEF54321

FIG. 16B

CERTIFICATE OF WINE DISTRIBUTION
DISTRIBUTION OF THIS PRODUCT IS CERTIFIED AS FOLLOWS.

AREA 0  (ABC)  FST:2008/11/20 5:21
AREA 1  (GHI)  FST:2008/12/18 6:15
AREA 2  (JKL)  JT:2008/12/22 7:25
AREA 3  (MNO) JT:2008/12/31 18:52
AREA 4  (PQR)  JT:2009/3/25 21:55
AREA 5  (STU)  JT:2009/4/1 10:22

FIG. 16C

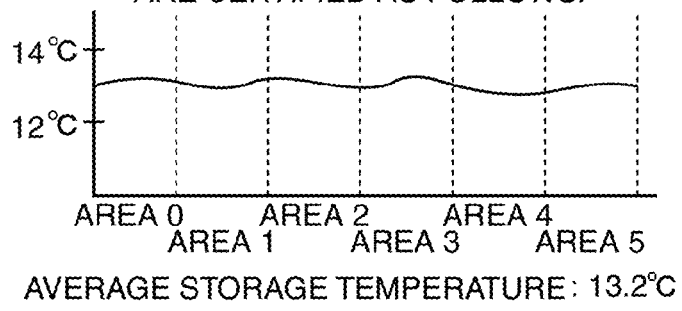

CERTIFICATE OF WINE HANDLING
THE STORAGE AND HANDLING CONDITIONS OF THIS PRODUCT ARE CERTIFIED AS FOLLOWS.

AVERAGE STORAGE TEMPERATURE: 13.2°C

FIG. 17A

WINE QUALITY INFORMATION

INFORMATION RELATED TO THE QUALITY OF THIS WINE IS SHOWN BELOW.

WINTER PRECIPITATION: 250 mm
AVERAGE GROWING TEMPERATURE: 24°C
PRECIPITATION DURING HARVEST: 82 mm
ALCOHOL: 14%
TANNIN: 7/10
SUGAR: 5%

FIG. 17B

WINE DISTRIBUTION INFORMATION

INFORMATION RELATED TO THE DISTRIBUTION OF THIS WINE IS SHOWN BELOW.

TOTAL BOTTLES PRODUCED : 5632
BOTTLES IN DISTRIBUTION CHANNEL : 1233
BOTTLES PURCHASED BY CONSUMERS : 1567
PRODUCTION NUMBER : 2343/5632

CURRENT AS OF 2009/4/20

FIG. 17C

CONSUMER ADVICE

· THIS WINE WAS BOTTLED FOUR MONTHS AGO AND SHOULD BE BEST TO DRINK IN THE BEGINNING OF NEXT MONTH.

· BEST FOOD MATCH: SAUTEED VEAL

· OPTIMUM STORAGE TEMPERATURE: 12°C TO 14°C

PRODUCT INFORMATION MANAGEMENT SYSTEM AND PRODUCT INFORMATION MANAGEMENT METHOD

CROSS-REFERENCE TO RELATED APPLICATIONS

Japanese Patent application No. 2008-246483 is hereby incorporated by reference in its entirety.

BACKGROUND

1. Field of Invention

The present invention relates to a product information management system and a product information management method.

2. Description of Related Art

Japanese Unexamined Patent Appl. Pub. JP-A-2004-217426 teaches a distribution management system that applies tag devices recording the product temperature and time to individual products that are shipped, and has a gate terminal device that issues a warning if a deterioration flag is set in the data received by the gate terminal device from the tag device.

With the technology taught in JP-A-2004-217426 the information recorded in the tag device is used only in the distribution process. More particularly, the consumer cannot use the information, and the information cannot be used effectively.

SUMMARY OF INVENTION

The product information management system and product information management method according to the present invention are directed to the foregoing problem and enable using information recorded in tag devices attached to products effectively.

A product information management system according to the present invention has a server device that records information related to a product to which a tag device is disposed, and a terminal device that acquires and presents information recorded on the server device. The terminal device includes an input receiving unit that accepts input of information recorded on the tag device, a query unit that sends information input through the input receiving unit to the server device and requests verification of the validity of the product, and a presentation unit that presents information that is transmitted when the validity of the product is verified by the server device. The server device includes a recording unit that records information related to the product, a verification unit that determines validity based on information sent from the terminal device when the terminal device requests verification of product validity, and a transmission unit that acquires and sends the corresponding information recorded in the recording unit to the terminal device when validity is verified by the verification unit.

This aspect of the invention can effectively use information recorded to a tag device because information related to a specific product can be acquired based on information recorded in a tag device disposed to the product.

In a product information management system according to another aspect of the invention information unique to each product is written to the tag device by the manufacturer during product manufacture, and the server device provides information related to the product to the presentation unit of the terminal device when verification of validity is successful based on information unique to each product.

This aspect of the invention can restrict disclosure of information related to other products because information related to the product is displayed when production by the actual manufacturer is verified.

In a product information management system according to another aspect of the invention the server device provides information related to production conditions of the product to the presentation unit of the terminal device when verification of validity is successful based on information unique to each product.

This aspect of the invention enables knowing under what conditions the product was produced because information related to the production conditions is displayed when production by the actual manufacturer is verified.

In a product information management system according to another aspect of the invention the product is distributed through a plurality of distribution steps, and information indicating passage through each distribution step is written to the tag device by a reader/writer disposed to each distribution step; and the server device causes the presentation unit of the terminal device to present information related to the product when verification of validity is successful based on information indicating passage through each distribution step.

This aspect of the invention can restrict disclosure of information related to other products because information related to the product is displayed when distribution through the authorized distribution channel is verified.

In a product information management system according to another aspect of the invention the server device causes the presentation unit of the terminal device to present information indicating a quantity of products of the same type in the distribution channel when verification of validity is successful based on information indicating passage through each distribution step.

This aspect of the invention enables knowing the rarity of a product, for example, because information indicating the quantity of products of the same type in the distribution channel is presented when distribution through the authorized distribution channel is verified.

In a product information management system according to another aspect of the invention the tag device records information related to the environment in which the product is placed, and the server device causes the presentation unit of the terminal device to present information related to the product when verification of validity is successful based on information related to the environment.

This aspect of the invention can restrict disclosure of information related to other products because information related to the product is displayed when proper handling is verified.

In a product information management system according to another aspect of the invention the server device produces information related to a consumption time of the product based on information related to the environment and causes the presentation unit of the terminal device to present information related to the consumption time when verification of validity is successful based on information related to the environment.

This aspect of the invention enables consuming the product at the best time in accordance with the environment in which the product was stored because information related to the product expiration date is displayed when proper handling of the product is verified.

In a product information management system according to another aspect of the invention the product is wine, and the server device causes the presentation unit of the terminal device to present information related to the product when the producer of the wine, distribution process, and handling conditions are valid.

This aspect of the invention enables presenting information related to the product only when the authenticity and quality of the wine can be assured because the product information is displayed when the producer of the wine, distribution process, and handling conditions are valid.

In a product information management system according to another aspect of the invention the input receiving unit is a reader/writer and reads information stored in the tag device.

This aspect of the invention enables acquiring information related to the product by reading the information stored in the tag device by means of the reader/writer.

In a product information management system according to another aspect of the invention the tag device can display stored information on a display device, and information displayed on the display device or information generated based on said information is input to the input receiving unit.

This aspect of the invention can acquire product-related information even when there is no reader/writer by inputting information displayed on the display device to the input receiving unit, and is therefore particularly user-friendly for the consumer, for example.

Another aspect of the invention is a product information management method for a product information management system having a server device that records information related to a product to which a tag device is disposed, and a terminal device that acquires and presents information recorded on the server device. The terminal device has an input step of accepting input of information recorded on the tag device, a query step of sending information input in the input step to the server device and requests verification of the validity of the product, and a presentation step of presenting information that is transmitted when the validity of the product is verified by the server device. The server device has a recording step of recording information related to the product in a recording device, a verification step of determining validity based on information sent from the terminal device when the terminal device requests verification of product validity, and a transmission step of acquiring and sends the corresponding information recorded in the recording unit to the terminal device when validity is verified in the verification step.

This aspect of the invention can effectively use information recorded to a tag device because information related to a specific product can be acquired based on information recorded in a tag device disposed to the product.

EFFECT OF THE INVENTION

The product information management system and product information management method according to the present invention enable using information recorded in tag devices attached to products effectively.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 11A and 11B are examples of the initial information written to nonvolatile memory.

FIG. 12 shows an example of data that is written to nonvolatile memory.

FIG. 13 shows an example of data stored in the host computer.

FIGS. 16A, 16B and 16C show examples of information displayed on the terminal device.

FIGS. 17A, 17B and 17C show examples of information displayed on the terminal device.

DESCRIPTION OF THE PREFERRED EMBODIMENTS

A preferred embodiment of the present invention is described below with reference to the accompanying figures. The product information management method of the invention is described below as the operation of a product information management system.

(A) Configuration of a Preferred Embodiment

Figure 1:
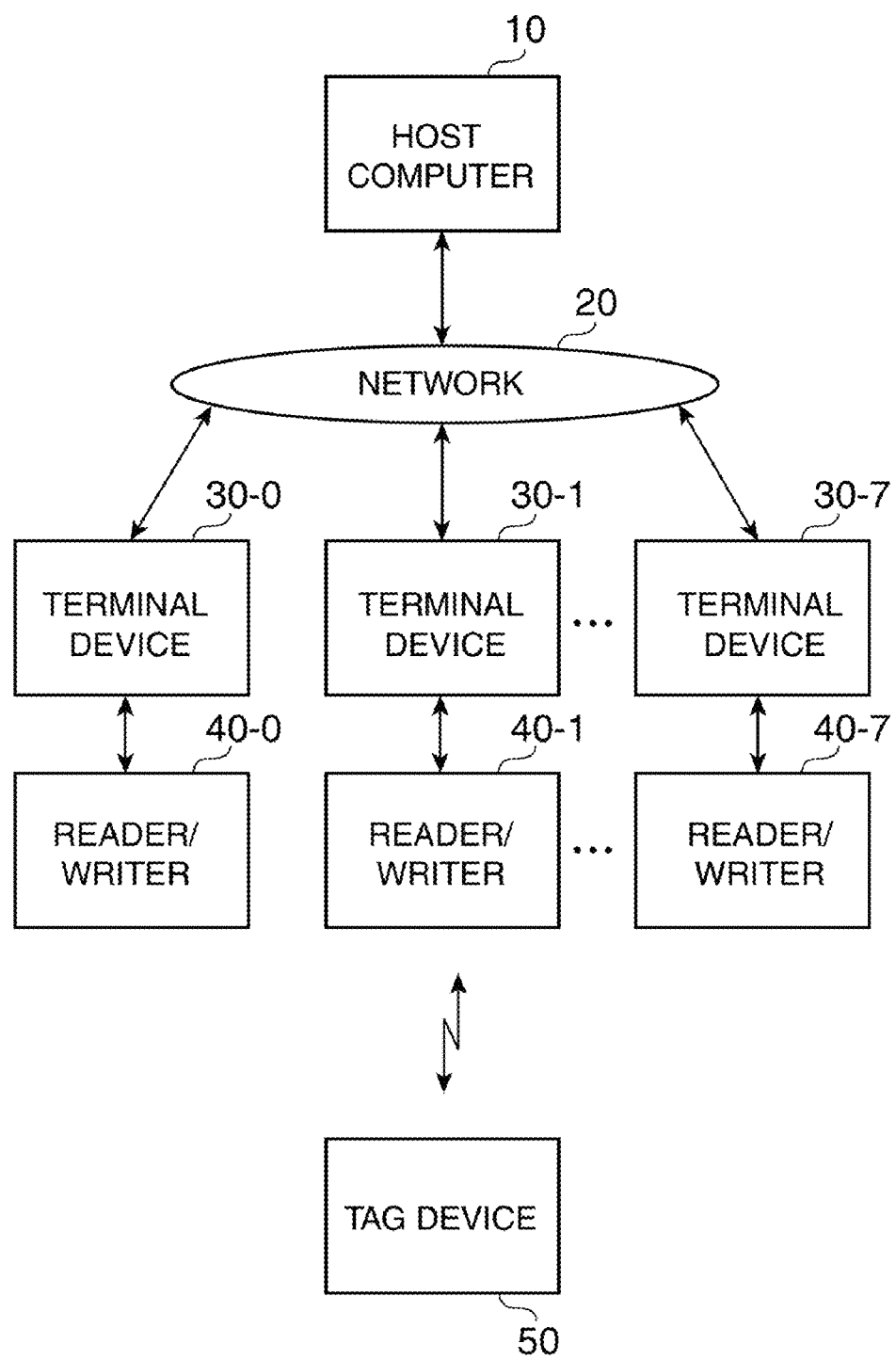
FIG. 1 is a block diagram showing the general configuration of a product information management system according to the invention.

FIG. 1 is a schematic block diagram showing the general configuration of a product information management system according to a preferred embodiment of the invention. As shown in FIG. 1 the main parts of a product information management system according to the invention include a host computer 10, a network 20, terminal devices 30-0 to 30-7, reader/writers 40-0 to 40-7, and a tag device 50.

Figure 2:
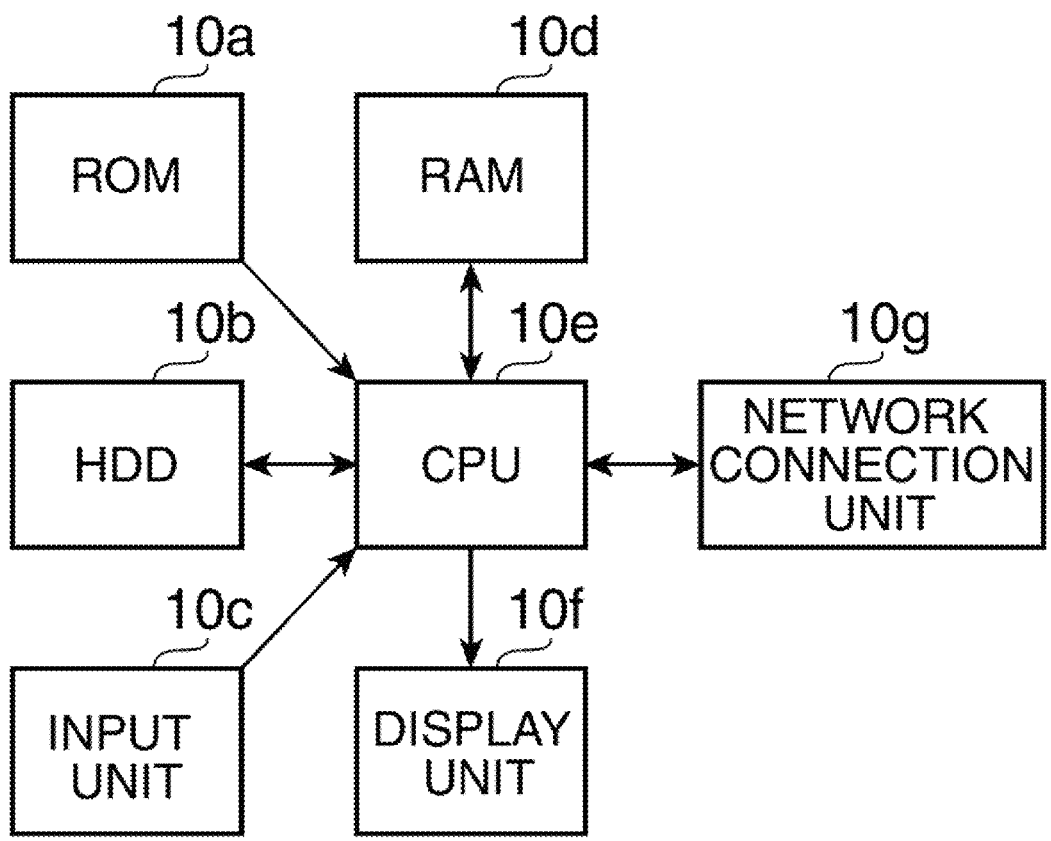
FIG. 2 is a block diagram showing the typical configuration of the host computer shown in FIG. 1.

As shown in FIG. 2, the host computer 10 has ROM (read-only memory) 10a, a hard disk drive 10b, an input unit 10c, RAM (random access memory) 10d, a CPU (central processing unit) 10e, a display unit 10f, and a network connection unit 10g. By executing an application program stored on the hard disk drive 10b, the host computer 10 acquires and manages information read from a tag device 50 by a reader/writer 40-0 to 40-7 through the terminal devices 30-0 to 30-7 and network 20. Data and the basic program executed by the CPU 10e are stored in ROM 10a.

The hard disk drive 10b also stores data and programs executed by the CPU 10e. The input unit 10c may be a keyboard, for example. RAM 10d functions as working area when the CPU 10e executes programs stored in ROM 10a or hard disk drive 10b. The CPU 10e controls other parts by executing programs stored in ROM 10a or hard disk drive 10*b*. The display unit 10*f* is, for example, a liquid crystal display (LCD). The network connection unit 10*g* converts data for communication over the network 20 with the terminal devices 30-0 to 30-7. Note that the host computer 10 stores information for individual products that is assigned by contract with individual manufacturers. A customer authentication process that is predefined for handling inquiries for registered information requires registration of a user that is not registered, and presents the stored information, for example, according to a predefined process to properly registered inquirers. The information that is disclosed and the data format, for example, can be freely configured and changed.

The network 20 may be the Internet, for example, and enables sending and receiving packetized data between the host computer 10 and the terminal devices 30-0 to 30-7. Note that because all of the terminal devices 30-0 to 30-7 are identically configured, they are described below as terminal device 30.

Figure 3:
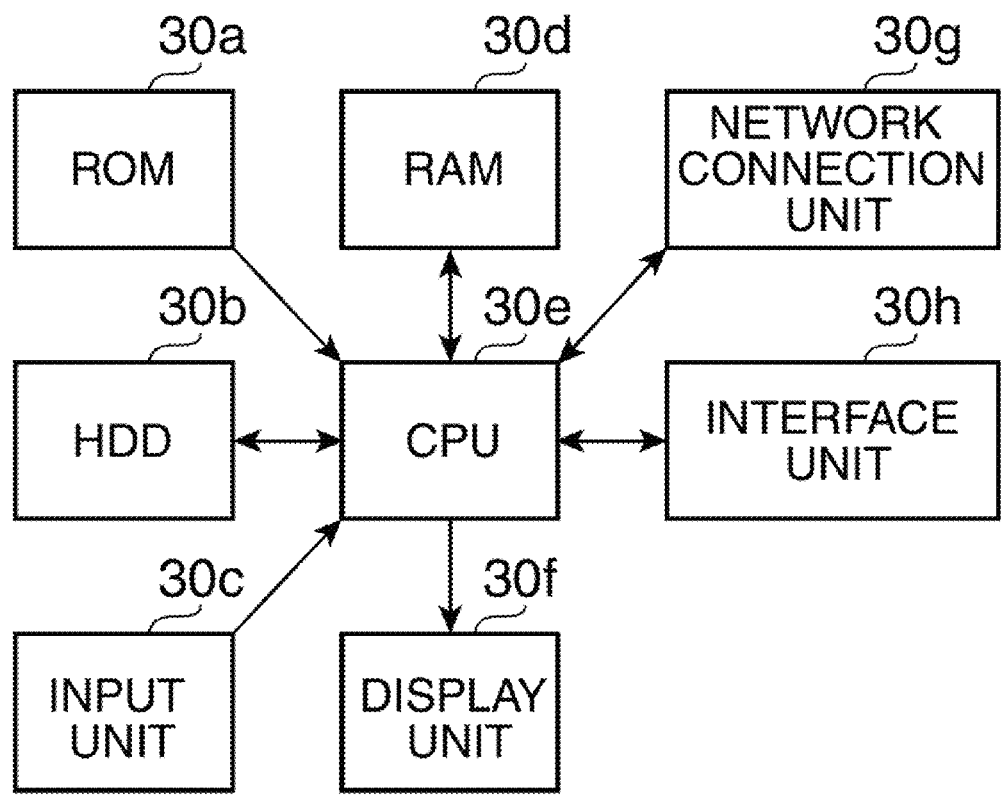
FIG. 3 is a block diagram showing the typical configuration of the terminal device shown in FIG. 1.

As shown in FIG. 3 each terminal device 30 has a ROM 30*a*, a hard disk drive 30*b*, an input unit 30*c*, RAM 30*d*, a CPU 30*e*, a display unit 30*f*, a network connection unit 30*g*, and an interface unit 30*h*. The configuration of the terminal device 30 is substantially the same as the host computer 10.

The reader/writer 40 is connected to the interface unit 30*h*, and information read by the reader/writer 40 is input through the interface unit 30*h*. The terminal device 30 stores the information read by the reader/writers 40-0 to 40-7 and sends the stored information to the host computer 10 by executing an application program stored on the hard disk drive 30*b*. When a request for information stored in the host computer 10 is received, the terminal device 30 accesses the host computer 10 to acquire and provide the stored information.

The reader/writers 40-0 to 40-7 are disposed to a distribution step through which products subject to quality control pass, read and verify the information recorded in the tag devices 50 disposed to the products, and write data including information unique to each distribution step to the tag devices 50. The reader/writers 40-0 to 40-7 may be rendered in a housing and used as handheld terminal devices, or rendered as modules that are installed to product shipping and receiving inspection lines. The reader/writer may also be used connected to a common personal computer interface (such as a USB (Universal Serial Bus)) so that the reader/writer can be used by end consumers. Note that this embodiment of the invention is described using wine (particularly high quality wine that requires strict temperature control, such as Appellation d'Origine Contrôlée (AOC) and Vin Délimité de Qualité Superieure (VDQS) wines) as the product subject to quality control, and the tag device 50 is affixed to the wine bottle as further described below.

Note further that in this embodiment of the invention terminal device 30-0 and reader/writer 40-0 are used by the manufacturer, terminal device 30-1 and reader/writer 40-1 are used by the shipper, terminal devices 30-2, 30-3 and reader/writers 40-2, 40-3 are used by a wholesaler, terminal device 30-4 and reader/writer 40-4 are used by another shipper, terminal devices 30-5, 30-6 and reader/writers 40-5, 40-6 are used by a retailer, and terminal device 30-7 and reader/writer 40-7 are used by the consumer.

Figure 4:
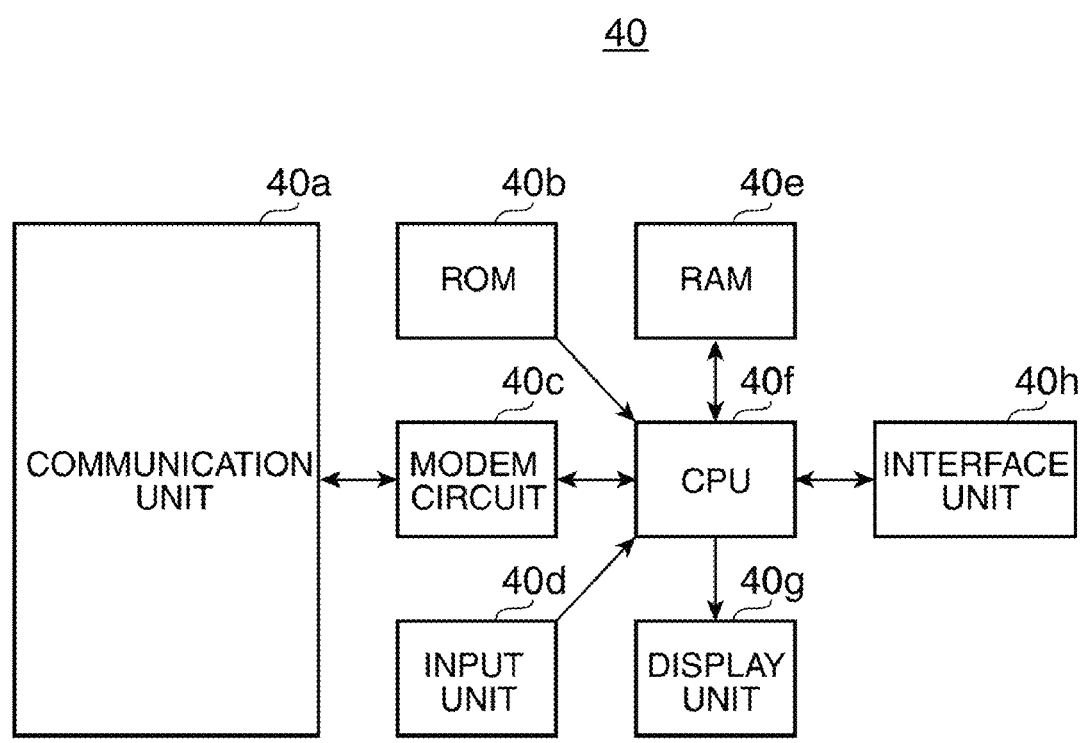
FIG. 4 is a block diagram showing the typical configuration of the reader/writer shown in FIG. 1.

FIG. 4 shows the configuration of the reader/writers 40-0 to 40-7 shown in FIG. 1. Note that because the reader/writers 40-0 to 40-7 are identically configured, they are described below as reader/writer 40. As shown in FIG. 4 each reader/writer 40 has a communication unit 40*a*, ROM 40*b*, a modem circuit 40*c*, an input unit 40*d*, RAM 40*e*, a CPU 40*f*, a display unit 40*g*, and an interface unit 40*h*.

The communication unit 40*a* has an antenna, receives information wirelessly from a tag device 50 through the antenna, and supplies power to the tag device 50 by means of electromagnetic induction.

The ROM 40*b* stores programs and data, and the CPU 40*f* controls other parts by executing processes based on the programs and data stored in the ROM 40*b*.

The modem circuit 40*c* modulates and sends a carrier wave based on information supplied from the CPU 40*f* to the tag device 50 through the communication unit 40*a*, and demodulates and extracts the original information from the data that is superposed on the carrier wave received by the communication unit 40*a*.

The input unit 40*d* is an input device such as a keyboard, for example, and generates and outputs information according to the operation executed by the user.

The RAM 40*e* is used as working memory when the CPU 40*f* executes the programs stored in ROM 40*b*.

The CPU 40*f* is a central processing unit that controls other parts of the reader/writer 40 by executing a program stored in ROM 40*b*.

The display unit 40*g* is, for example, a liquid crystal display device and is used for displaying information supplied from the CPU 40*f*.

The interface unit 40*h* executes a process that converts the data format when exchanging information with the terminal device 30. Note that the interface unit 40*h* may be a communication circuit enabling connecting to a cell phone carrier or with other Ethernet (R) or Bluetooth (R) devices, for example.

When the reader/writer 40 is connected to a personal computer, the display unit and input unit of the personal computer may be used instead of the input unit 40*d* and display unit 40*g*.

Figure 5:
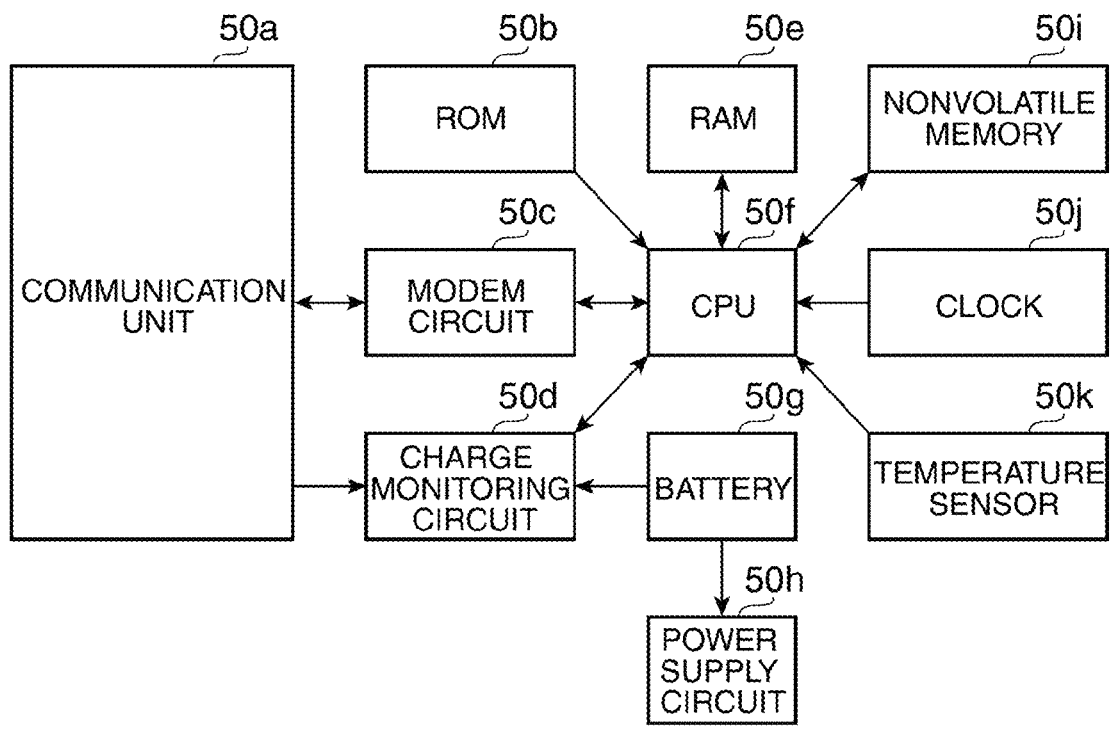
FIG. 5 is a block diagram showing the typical configuration of the tag device shown in FIG. 1.

FIG. 5 shows the configuration of the tag device 50 shown in FIG. 1. As shown in FIG. 5 the tag device 50 has a communication unit 50*a*, ROM 50*b*, a modem circuit 50*c*, a charge monitoring circuit 50*d*, RAM 50*e*, a CPU 50*f*, a battery 50*g*, a power supply circuit 50*h*, nonvolatile memory 50*i*, a clock 50*j*, and a temperature sensor 50*k*.

The communication unit 50*a* has an antenna, receives information wirelessly from a reader/writer 40 through the antenna, and has power supplied from the reader/writer 40 by means of electromagnetic induction.

The ROM 50*b* stores programs and data, and the CPU 50*f* controls other parts by executing processes based on the programs and data stored in the ROM 50*b*.

The modem circuit 50*c* modulates and sends a carrier wave based on information supplied from the CPU 50*f* to the reader/writer 40 through the communication unit 50*a*, and demodulates and extracts the original information from the data that is superposed on the carrier wave sent from the reader/writer 40 and received by the communication unit 50*a*.

The charge monitoring circuit 50*d* charges the battery 50*g* using the power supplied from the reader/writer 40, monitors the charge level of the battery 50*g*, and communicates the result to the CPU 50*f*.

The RAM 50*e* is used as working memory when the CPU 50*f* executes the programs stored in ROM 50*b*.

The CPU 50*f* is a central processing unit that controls other parts of the reader/writer 50 by executing a program stored in ROM 50*b*.

The battery 50*g* is, for example, a lithium ion battery or other type of storage battery, and produces and supplies DC power to the power supply circuit 50*h*. Note that a super capacitor (electric double-layer capacitor) can be used instead of a storage battery.

The power supply circuit 50h controls the voltage of the DC power supplied from the battery 50g to a constant voltage, and supplies the resulting constant voltage DC power to other parts of the tag device 50.

The nonvolatile memory 50i stores temperature data measured by the temperature sensor 50k and time data, and other information related to the wine, which is the product being managed in this embodiment of the invention.

The clock 50j is a real-time clock (RTC), for example, that generates and outputs time and date information. The clock 50j also generates a timer interrupt at the set date and time.

The temperature sensor 50k is rendered by a thermistor or thermocouple, measures the temperature of the wine being monitored for quality control, and outputs the corresponding temperature data.

Figure 6:
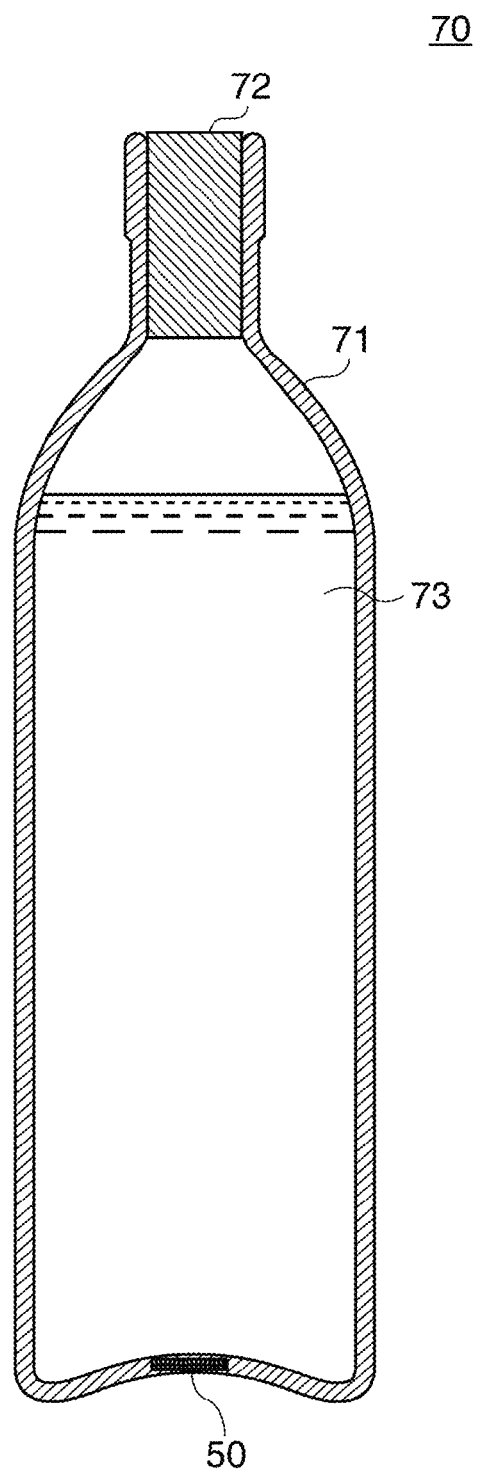
FIG. 6 shows an example in which the tag device is attached to the bottom of a wine bottle.

FIG. 6 shows an example of a tag device 50 attached to a bottle 71 of bottled wine 70 (also referred to as simply wine 70 below). In the embodiment shown in FIG. 6 the liquid wine 73 is stored inside the bottle 71 of the bottled wine 70, and a cork stopper 72 is inserted to the mouth of the bottle 71. A tag device 50 is affixed to the bottom part of the bottle 71. Note that because the temperature sensor 50k is disposed in contact with the glass of the bottle 71, the temperature of the bottle 71 can be detected by the temperature sensor 50k with no delay.

Figure 7:
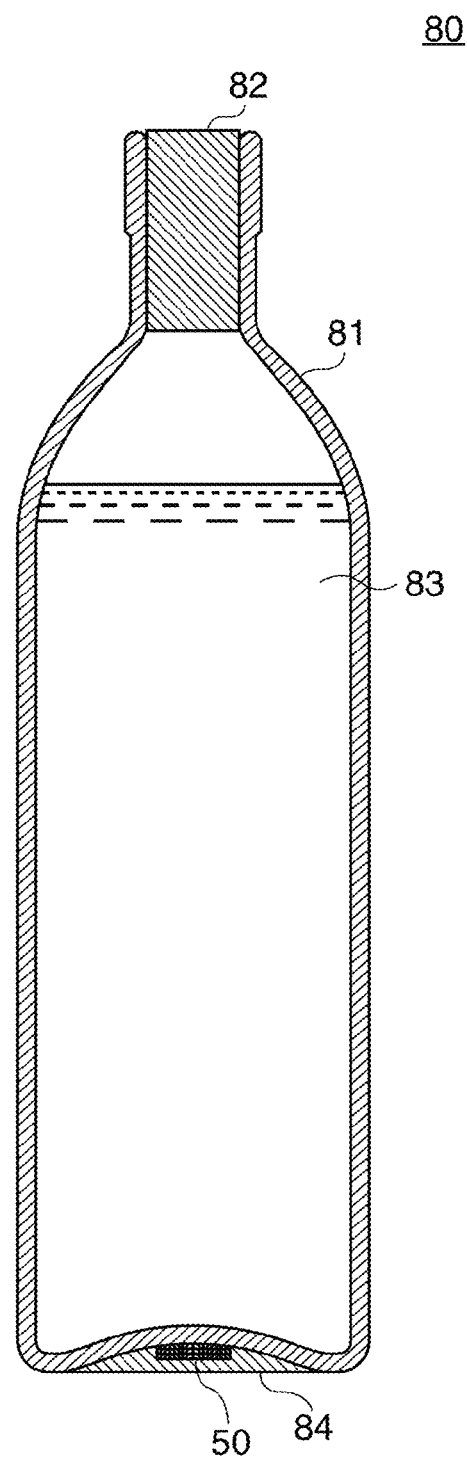
FIG. 7 shows another example in which the tag device is attached to the bottom of a wine bottle.

FIG. 7 shows another example of a tag device 50 attached to a bottle 81 of bottled wine 80. In the embodiment shown in FIG. 7 the liquid wine 83 is stored inside the bottle 81 of the bottled wine 80, and a cork stopper 82 is inserted to the mouth of the bottle 81. A tag device 50 is affixed in a recess in the bottom of the bottle 81, and the tag device 50 is sealed in resin 84. Note that because the temperature sensor 50k is disposed in contact with the glass of the bottle 81 as described above, the temperature of the bottle 81 can be detected by the temperature sensor 50k with no delay.

Note, further, that the invention is described below using the bottled wine 70 shown in FIG. 6 by way of example, but a configuration as shown in FIG. 6 or FIG. 7 may be used.

Figure 8A:
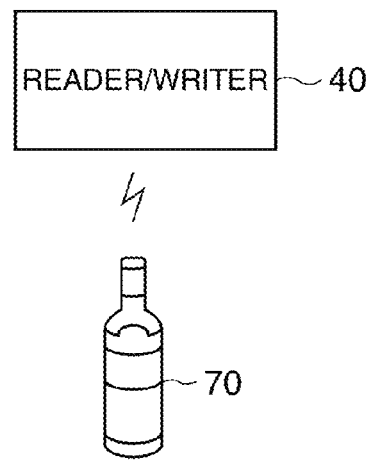
FIGS. 8A and 8B illustrate communication between the reader/writer and the tag device.
Figure 8B:
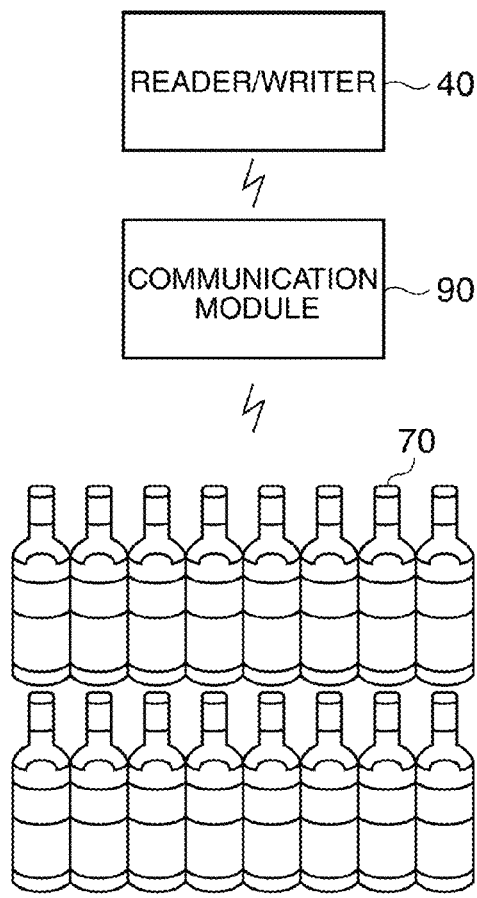

FIG. 8 describes communication between a tag device 50 affixed to bottled wine 70 and a reader/writer 40. In FIG. 8A there is one bottle of bottled wine 70 that communicates with the reader/writer 40, and the tag device 50 attached to the bottled wine 70 and the reader/writer 40 communicate one-to-one in this scenario. When there are multiple bottles of bottled wine 70 to communicate with as shown in FIG. 8B, communication may go through a communication module 90. More specifically, when multiple bottles of bottled wine 70 are present, such as in a shipping container, a communication module 90 that can communicate with each individual bottle of wine 70 is disposed inside the container, and communication between the reader/writer 40 and the tag devices 50 of the bottled wine 70 inside the container goes through the communication module 90.

B. Operation

The operation of a preferred embodiment of the invention is described next. The concept of the operation of a preferred embodiment of the invention is described first. The distribution process of bottled wine 70 and the operation of the tag device 50 in the distribution process are then described. Operation when a request related to information recorded in the host computer 10 is received from a terminal device 30-6 or terminal device 30-7 used by a retailer or end consumer is received is also described.

B-1 Outline of the Operation of a Preferred Embodiment

Figure 9:
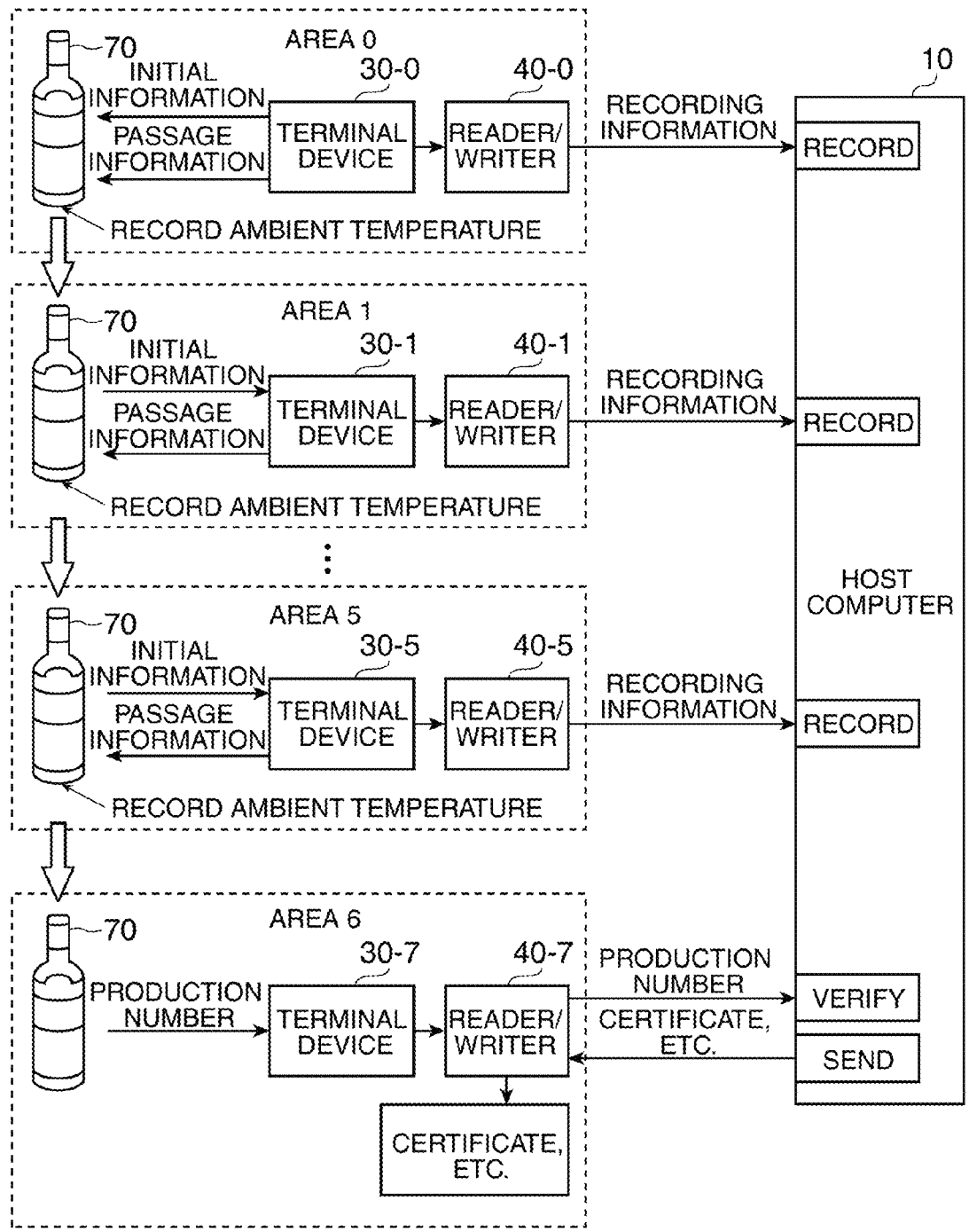
FIG. 9 illustrates the operation of the a tag device according to a preferred embodiment of the invention.

FIG. 9 outlines the operation of a preferred embodiment of the invention. As shown in this figure the bottled wine 70 reaches the consumer after passing through plural distribution steps in areas 0 to 5.

In area 0, which is managed by the manufacturer, the tag devices 50 affixed to the bottled wine 70 are initialized with the production lot number and other information that is written by the reader/writer 40-0 together with information indicating that the bottled wine 70 passed through area 0. The information written to the tag device 50 (that is, the initialized information and information denoting passage through area 0) is also sent over the network 20 to the host computer 10 and recorded thereby. While the bottled wine 70 to which this initial information is written is stored temporarily by the manufacturer, the tag device 50 measures and stores the temperature of the bottled wine 70 at a specified frequency together with the data measurement date in nonvolatile memory 50i using the power stored in the battery 50g.

When the bottled wine 70 is shipped from the manufacturer through a shipper, the shipper uses the reader/writer 40-1 to acquire the temperature data for area 0 that is recorded in the tag device 50 and determine if an abnormal temperature is recorded. If an abnormal temperature is not detected, the recorded information is sent to the host computer 10 and recorded, and information indicating passage through area 1 is written to the tag device 50 and to the host computer 10. If a temperature problem is detected, there is a problem with the quality of the wine and the offending bottle of wine 70 is removed from the distribution process.

A similar process is executed in each area, the recorded information is read and whether a temperature problem occurred is determined by the reader/writer 40 in each area, and if a problem is not detected the recorded information is sent to and recorded by the host computer 10 and distribution information indicating that the product passed the area is recorded by the tag device 50 and the host computer 10.

The quality of the bottled wine 70 may also be checked when a consumer buys bottled wine 70 at a retailer or consumes the bottled wine 70 at home. In the latter situation, for example, the consumer reads the tag device 50 on the bottled wine 70 in question using a reader/writer 40-7 at home. As a result, the reader/writer 40-7 reads the product number, for example, stored in the tag device 50, sends the captured information through the terminal device 30-7 to the host computer 10, and requests return of a certificate of authenticity, for example. The host computer 10 then checks the authenticity of the queried bottled wine 70 based on the product number, for example, that was received.

Note that authenticity as used here means that the bottled wine 70 in question was manufactured by the actual manufacturer, and the product passed through the normal distribution channels and was handled appropriately.

Whether or not the product was produced by the manufacturer of record is confirmed based on whether or not the product number, for example, which is a unique number registered in the tag device 50, is registered in the host computer 10.

Whether or not the product passed through the normal distribution channels is determined based on the distribution information recorded in the host computer 10. If the product has passed through the normal distribution channels, information relating to all steps in the distribution process is recorded in the host computer 10, and whether or not the product has passed through the normal distribution channels can be confirmed by checking this information.

Whether or not the product has been properly handled can be determined based on the temperature information recorded in the host computer 10.

If all of these conditions are satisfied, the bottled wine 70 is determined to be authentic, a wine certificate is sent from the host computer 10 to the terminal device 30-7, and the consumer can reference the certificate for the bottle of wine 70 in question.

By, for example, displaying information indicating that the product passed each distribution stage or temperature-related information together with the certificate, the consumer can be made even more confident of the product quality. Note, further, that authenticity may also be verified if, for example, the information recorded in the tag device 50 and the information recorded in the host computer 10 match. More specifically, by determining authenticity based on whether or not the product lot number, for example, distribution information, and recorded temperature data are the same in the tag device 50 and the host computer 10, forgeries can be reliably detected.

B-2 Operation in the Bottled Wine Distribution Process

The bottled wine 70 distribution process and the information recorded at each distribution step are described next with reference to FIG. 10. The manufacturer in area 0 produces and bottles the wine in bottles 71 as bottled wine 70 that is readied for shipping (P1).

When bottling is completed, the initial information is written using the reader/writer 40-0 to the tag device 50 affixed to each bottle 71 (P2). The initial information includes, for example, information such as shown in FIG. 11 and information such as shown in FIG. 12.

FIG. 11 shows an example of the information that is written as the initial information. In this example the initial information includes unique product information such as shown in FIG. 11A, and information related to each area in the distribution process such as shown in FIG. 11B. More specifically, the example shown in FIG. 11A includes the manufacturer name, product name, production site number, lot number, and a sequential product number, which in this example have the values ABC, DEF, ABC12345, DEF54321, and 2343, respectively. Note that in the case of bottled wine having the same name the sequential product number denotes the order in which a particular bottle of wine is produced.

As shown in FIG. 11B, the information relating to particular areas in the distribution process includes the ID number of the reader/writer 40-0 to 40-7 in each area, the area number, the recording frequency, and a pass check.

The ID number is a unique value assigned to each of the reader/writers 40-0 to 40-7, and is sent from the reader/writer 40-0 to 40-7 when reading/writing the tag device 50 information. The tag device 50 receiving the ID number determines if the received ID matches a stored ID, starts reading/writing information if the IDs match and an authorized reader/writer is confirmed, and otherwise rejects reader/writer requests.

The area number is the number of the area where the reader/writer with the particular ID number is located.

The recording frequency denotes the frequency at which the temperature data is measured and recorded. In this embodiment "24 h" denotes recording once every 24 hours, for example.

The pass check is 0 when the tag device 50 is initialized, is changed to 1 each time data is read/written by a reader/writer, and thus denotes passage through a particular area.

Note that in the example shown in FIG. 11B the information on the first line shows that in area 0 the ID number of the reader/writer was 00000, the recording frequency is once every 24 h, and the pass check is the unchecked value 0.

FIG. 12 illustrates how the temperature data measured in each area is stored. This example has storage areas reserved for areas 0 to 6. Data denoting the measurement date and temperature are stored for area 0, and the initialized value "FF" is stored for the other areas. Because the longest time stored in each area and the recording frequency are known in advance in this embodiment of the invention, the storage space required for each area is reserved in nonvolatile memory 50i and initialized with the value FF when the initial information is written.

Figure 10:
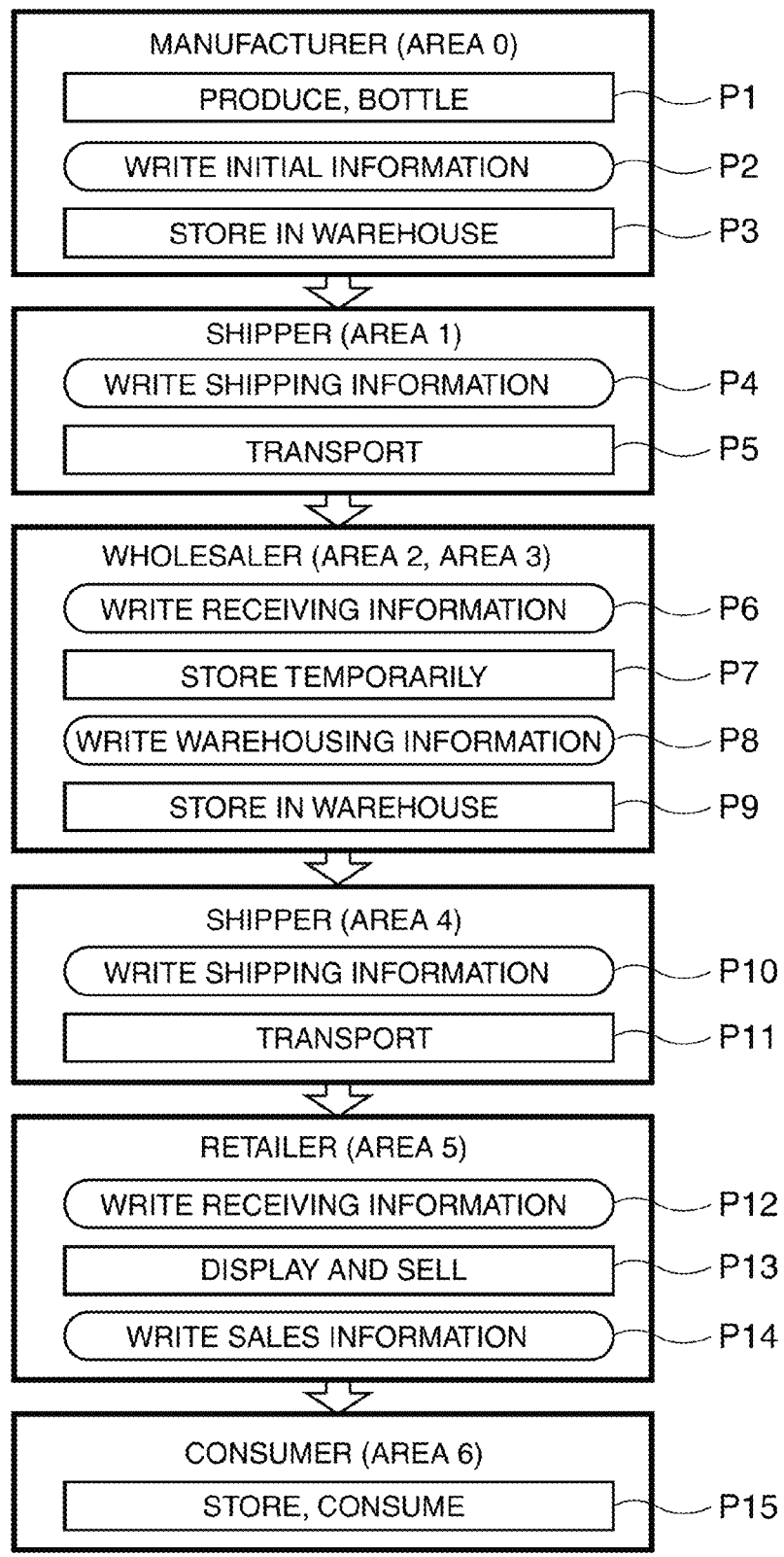
FIG. 10 illustrates the distribution process of a wine bottle.

More specifically, when writing the initial information shown in FIG. 10 (P2), the reader/writer 40-0 writes the information shown in FIG. 11A and FIG. 11B to nonvolatile memory 50i in the tag device 50, reserves space for the area information in nonvolatile memory 50i and writes the default value FF to each reserved address. In addition, because area 0 was passed normally, the pass check for area 0 is changed to 1. Using the power sent from the reader/writer 40-0, the charge monitoring circuit 50d charges the battery 50g to a full charge. When the initial information is written, the tag device 50 acquires the recording frequency (24 h) of the information (information for area 0) that was recorded first as shown in FIG. 11B, sets the clock 50j accordingly, and then enters a low power consumption sleep mode.

The clock 50j thus asserts an interrupt every 24 hours. When an interrupt is asserted, the CPU 50f changes from the sleep mode to the normal operating mode, acquires the current time and temperature from the clock 50j and temperature sensor 50k, stores the time and temperature to nonvolatile memory 50i, and returns to the sleep mode after the data is stored.

The reader/writer 40-0 sends the initial information and the pass check stored in the tag device 50 to the terminal device 30-0. The terminal device 30-0 stores the received initial information in a database and sends the information to the host computer 10. Information forgery can be prevented at this time by sending specific information (such as a password) from the terminal device 30-0 to the host computer 10 for verification.

The host computer 10 receives the transmitted information through the network connection unit 10g, and stores the information in a database stored on the hard disk drive 10b. FIG. 13 shows an example of the information recorded on the hard disk drive 10b.

As shown in FIG. 13, the information recorded on the hard disk drive 10b includes manufacturing information, distribution information, handling information, quality information, and advice information.

The manufacturing information as used herein is the same information that is recorded to the tag device 50 as the initial information.

The distribution information is information corresponding to the pass check denoting whether or not a particular bottle of bottled wine 70 passed each area in the distribution process.

The handling information is information corresponding to the information shown in FIG. 12 recording the storage temperature of the bottled wine 70 in each area of the distribution process.

The quality information is information denoting, for example, the sugar content of the wine, the alcohol content, how dry the wine is, or the weather conditions. Because this information is common to the bottled wine 70 of the same product name, the file name (such as "quality.html") of the HTML (HyperText Markup Language) data recording the product information is stored as the quality information.

The advice information is, for example, information about the optimum storage temperature for the wine and optimal food pairings. Because this information is common to the bottled wine 70 of the same product name, the file name (such as "advice.html") of the HTML data recording the advice information is stored as the advice information.

Note that if part of the quality information and advice information is different for individual bottles of the bottled wine 70, individualized information can be created according to the specific conditions of each bottle of bottled wine 70 using a CGI (Common Gateway Interface). For example, the "best time to drink" information can be individually displayed according to how much time is required from when a particular bottled wine 70 is produced until it reaches the consumer.

When writing the initial information ends, the bottled wine 70 is stored in a warehouse of the manufacturer for approximately one month, for example (P3). While stored in the warehouse the tag device 50 goes from the sleep mode to the normal operating mode every 24 hours as described above, acquires and stores the temperature data and time/date data in the storage area reserved for area 0 in the nonvolatile memory 50*i*, and then resumes the sleep mode. The temperature of the wine while stored in the warehouse can thus be acquired and stored by repeating this operation.

Specific examples of the stored data include the measurement date and time, and the temperature, as shown in FIG. 12. In the example shown in FIG. 12 "FST:2008/11/20 5:21" is stored as the measurement date and time, and "13.5" is stored as the temperature. Note that FST denotes French Summer Time, that is, daylight savings time in France. If the time zone changes while the bottled wine 70 is shipped, the date/time of the clock 50*j* are adjusted when data is read/written by the reader/writer 40.

If the detected temperature is not within the normal range, the temperature sensor 50*k* issues an interrupt and informs the CPU 50*f* of an abnormal temperature. More specifically, the temperature sensor 50*k* does not generate an interrupt if the detected temperature is in the optimum wine storage temperature range of 12° C. to 14° C. (optimum temperature range Z0). However, if the detected temperature is in the range from 0 to 12° C. or 14° to 20° C. (caution temperature ranges Z1 and Z3), an interrupt is generated once every two hours, for example. Furthermore, if the detected temperature is in the range less than 0° C. or greater than 20° C. (dangerous temperature ranges Z2 and Z4), an interrupt is generated once every hour, for example.

When an interrupt is issued from the temperature sensor 50*k*, the CPU 50*f* records the temperature data acquired from the temperature sensor 50*k* and the time/date data to nonvolatile memory 50*i* regardless of the set recording frequency. This assures that abnormal temperatures are recorded accurately without fail whenever an abnormal temperature is detected.

The bottled wine 70 stored in a warehouse is then transferred to a shipper. At this time the shipper writes the shipping information by means of reader/writer 40-1 (P4).

More specifically, because "11111" is sent as the ID number from the reader/writer 40-1, the tag device 50 receiving this ID number references the information shown in FIG. 11B, verifies the reader/writer 40-1 as an authenticated reader/writer because the ID numbers match, and recognizes that the next area is area 1. The recording frequency is also recognized as 1 h, and the pass check for area 1 is changed from 0 to 1 because area 1 was passed.

Information denoting the End of File (such as EF) is also stored at the end of the area corresponding to area 0 as shown in FIG. 12. The charge monitoring circuit 50*d* of the tag device 50 also recharges the battery 50*g* using the power sent from the reader/writer 40-1. The reader/writer 40-1 also acquires the information stored in the tag device 50 and determines if the storage temperature is normal.

More specifically, the reader/writer 40-1 determines if the temperature data acquired from the tag device 50 is in the optimum temperature range of 12° to 14° C., and if the temperature is not within this range issues a warning, for example, that the storage temperature is not normal. This enables the shipper to know that the storage conditions were not normal up until the time the shipper received the bottled wine 70, and enables the shipper to remove the bottled wine 70 from the distribution channel. It is also possible to know that the quality of the bottled wine 70 deteriorated due to a fault of the manufacturer.

If the storage temperature is determined to be normal, pass check and temperature data acquired from the tag device 50 are stored in the database of the terminal device 30-1, and sent to the terminal device 30-0 and the host computer 10. The same data is stored by the terminal device 30-0 and host computer 10. More specifically, the host computer 10 changes the pass check of area 1 to 1 in the distribution information shown in FIG. 13, and stores the measurement date/time information and the temperature in the storage area corresponding to handling information area 0. Verification using a password can also be used to prevent data forgery.

The manufacturer can also know the storage status in the manufacturer's area by reading the data registered by the terminal device 30-0. In addition, by storing the data in the host computer 10, consumers considering purchasing the wine and consumers that have purchased the wine can know the storage conditions throughout the distribution process.

When reading/writing data by the reader/writer 40-1 is completed, the shipper transports the bottled wine from the manufacturer to the wholesaler (P5). Shipping in this example requires approximately five days.

While the wine is in transit the tag device 50 switches from the sleep mode to the normal operating mode and acquires the temperature and time/date data at a frequency of once every hour based on the set recording frequency of 1 h, and stores the acquired information in the storage area for area 1 in FIG. 12. If a temperature problem is detected, the tag device 50 records details about the conditions when the abnormal temperature was detected based on an interrupt from the temperature sensor 50*k*.

When the bottled wine 70 is delivered to the wholesaler by the shipper, the wholesaler writes receiving information by means of reader/writer 40-2 (P6). More specifically, because "22222" is sent as the ID number from the reader/writer 40-2, the tag device 50 receiving this ID number references the information shown in FIG. 11B, verifies the reader/writer 40-2 as an authenticated reader/writer because the ID numbers match, and recognizes that the next area is area 2. The recording frequency is also recognized as 24*h*, and the pass check for area 2 is changed to 1 because area 2 was passed.

Information denoting the End of File is also stored at the end of the area corresponding to area 1 as shown in FIG. 12. The charge monitoring circuit 50*d* of the tag device 50 also recharges the battery 50*g* using the power sent from the reader/writer 40-2. The reader/writer 40-2 also acquires the temperature data for area 1 stored in the tag device 50 and determines if the storage temperature is in the optimum temperature range of 12° C. to 14° C., and issues a warning, for example, that the storage temperature is not normal if the storage temperature is not in this range. This enables the wholesaler to know whether or not the storage conditions were normal up until when the wholesaler received the bottled wine 70.

If the storage temperature is determined to be normal, the pass check and temperature data acquired from the tag device 50 are saved in a database in the terminal device 30-2 and sent to the terminal device 30-1 and the host computer 10. The same data is then saved by the terminal device 30-1 and the host computer 10. More specifically, the host computer 10 changes the pass check of area 2 to 1 in the distribution information shown in FIG. 13, and stores the measurement date/time information and the temperature data in the storage area corresponding to handling information area 1.

The shipper can also know the storage status in the its area by reading the data stored by the terminal device 30-1. In addition, because the storage conditions to that point in the distribution process are cumulatively stored by the host computer 10, the consumer that purchases the wine can know the storage conditions throughout the distribution process.

When reading/writing data by the reader/writer 40-2 is completed, the wholesaler temporarily stores the bottled wine 70 received from the shipper (P7). This temporary storage period is approximately one week in this example. While the wine is temporarily stored, the tag device 50 switches from the sleep mode to the normal operating mode and acquires the temperature and time/date data at a frequency of once every 24 hours, and stores the acquired information in the storage area for area 2 in FIG. 12. If an abnormal temperature is detected, the tag device 50 records details about the storage conditions when the abnormal temperature was detected based on an interrupt from the temperature sensor 50k.

When this temporary storage period ends, the wholesaler stores the bottled wine 70 in the wholesaler's warehouse according to the distribution conditions of the market or the inventory levels of the retailers. Before storing the wine in the warehouse, the wholesaler writes inventory information by means of reader/writer 40-3 (P8). More specifically, because "33333" is sent as the ID number from the reader/writer 40-3, the tag device 50 receiving this ID number references the information shown in FIG. 11B, verifies the reader/writer 40-3 as an authenticated reader/writer because the ID numbers match, and recognizes that the area is area 3. The recording frequency is also recognized as 168 h, and the pass check for area 3 is changed to 1 because area 3 was passed.

Information denoting the End of File is also stored at the end of the area corresponding to area 2 as shown in FIG. 12. The charge monitoring circuit 50d of the tag device 50 also recharges the battery 50g using the power sent from the reader/writer 40-3. The reader/writer 40-3 also acquires the information stored in the tag device 50 and determines if the storage temperature is in the optimum temperature range of 12° C. to 14° C., and issues a warning, for example, that the temperature is not normal if the storage temperature is not in this range. This enables the wholesaler to know whether or not the storage conditions were normal while the bottled wine 70 was in temporary storage.

If the storage temperature is determined to be normal, the pass check and temperature data acquired from the tag device 50 are saved in a database in the terminal device 30-3 and sent to the terminal device 30-2 and the host computer 10. The same data is then saved by the terminal device 30-2 and the host computer 10. The host computer 10 changes the pass check of area 3 to 1 in the distribution information shown in FIG. 13, and stores the measurement date/time information and the temperature data in the storage area corresponding to handling information area 2.

When reading/writing data by the reader/writer 40-3 is completed, the wholesaler stores the bottled wine 70 in the warehouse (P9). This temporary storage period is a maximum of approximately 4 weeks, for example. While the wine is warehoused, the tag device 50 switches from the sleep mode to the normal operating mode and acquires the temperature and time/date data at a frequency of once every 168 hours, and stores the acquired information in the storage area for area 3 in FIG. 12. If an abnormal temperature is detected, the abnormal temperature conditions are accurately recorded based on an interrupt from the temperature sensor 50k. It should be noted that because the recording frequency while the product is warehoused is an extremely long interval of once a week, a temperature problem may occur between one recording and the next recording, but even if this happens the abnormal condition is recorded at a frequency of once an hour or once every two hours as a result of the interrupt asserted from the temperature sensor 50k.

The bottled wine 70 stored in the warehouse of the wholesaler is then transferred to another shipper. At this time the shipper writes the shipping information by means of reader/writer 40-4 (P10).

More specifically, because "44444" is sent as the ID number from the reader/writer 40-4, the tag device 50 receiving this ID number references the information shown in FIG. 11B, verifies the reader/writer 40-4 as an authenticated reader/writer because the ID numbers match, and recognizes that the area is area 4. The recording frequency is also recognized as 1 h, and the pass check for area 4 is changed to 1 because area 4 was passed.

Information denoting the End of File (such as EF) is also stored at the end of the area corresponding to area 3 as shown in FIG. 12. The charge monitoring circuit 50d of the tag device 50 also recharges the battery 50g using the power sent from the reader/writer 40-4. The reader/writer 40-4 also acquires the information stored in the tag device 50 and determines if the storage temperature is in the optimum temperature range of 12° to 14° C., and if the temperature is not within this range issues a warning, for example, that the storage temperature is not normal. This enables the shipper to know if the storage conditions were normal up until the time the shipper received the bottled wine 70. If the storage conditions were not normal, the bottled wine 70 is removed from the distribution channel.

If the storage temperature is determined to be normal, pass check and temperature data acquired from the tag device 50 are stored in the database of the terminal device 30-4, and sent to the terminal device 30-3 and the host computer 10. The same data is stored by the terminal device 30-3 and host computer 10. The host computer 10 changes the pass check of area 4 to 1 in the distribution information shown in FIG. 13, and stores the measurement date/time information and the temperature in the storage area corresponding to handling information area 3.

When reading/writing data by the reader/writer 40-4 is completed, the shipper transports the bottled wine from the wholesaler to the retailer (P11). Shipping in this example requires approximately five days.

While the wine is in transit the tag device 50 switches from the sleep mode to the normal operating mode and acquires the temperature and time/date data at a frequency of once every hour, and stores the acquired information in the storage area for area 4 in FIG. 12. If a temperature problem is detected, the abnormal temperature conditions are accurately recorded based on an interrupt from the temperature sensor 50k.

When the bottled wine 70 is delivered to the retailer by the shipper, the retailer writes receiving information by means of reader/writer 40-5 (P12). More specifically, because "55555" is sent as the ID number from the reader/writer 40-5, the tag device 50 receiving this ID number references the information shown in FIG. 11B, verifies the reader/writer 40-5 as an authenticated reader/writer because the ID numbers match, and recognizes that the next area is area 5. The recording frequency is also recognized as 24h, and the pass check for area 5 is changed to 1 because area 5 was passed.

Information denoting the End of File is also stored at the end of the area corresponding to area 4 shown in FIG. 12. The charge monitoring circuit 50d of the tag device 50 also recharges the battery 50g using the power sent from the reader/writer 40-5. The reader/writer 40-5 also acquires the information stored in the tag device 50 and determines if the storage temperature is in the optimum temperature range of 12° C. to 14° C., and issues a warning, for example, that the temperature is not normal if the storage temperature is not in this range. This enables the retailer to know whether or not the storage conditions were normal up until when the retailer received the bottled wine 70. If the storage temperature is not normal, the offending bottled wine 70 is removed from the shelves and products for sale.

If the storage temperature is determined to be normal, the pass check and temperature data acquired from the tag device 50 are saved in a database in the terminal device 30-5 and sent to the terminal device 30-4 and the host computer 10. The same data is then saved by the terminal device 30-4 and the host computer 10. The host computer 10 changes the pass check of area 5 to 1 in the distribution information shown in FIG. 13, and stores the measurement date/time information and the temperature data in the storage area corresponding to handling information area 4.

When reading/writing data by the reader/writer 40-5 is completed, the retailer displays and sells the bottled wine 70 received from the shipper (P13). This display and sales period is approximately two weeks in this example. While the wine is displayed for sale, the tag device 50 switches from the sleep mode to the normal operating mode and acquires the temperature and time/date data at a frequency of once every 24 hours, and stores the acquired information in the storage area for area 5 in FIG. 12. If an abnormal temperature is detected, the abnormal temperature conditions are accurately recorded based on an interrupt from the temperature sensor 50k.

When the displayed bottled wine 70 is purchased by a consumer, the retailer writes sales information by means of reader/writer 40-6 (P14). More specifically, because "66666" is sent as the ID number from the reader/writer 40-6, the tag device 50 receiving this ID number references the information shown in FIG. 11B, verifies the reader/writer 40-6 as an authenticated reader/writer because the ID numbers match, and recognizes that the area is area 6. The recording frequency is also recognized as 168h, and the pass check for area 6 is changed to 1 because area 6 was passed.

Information denoting the End of File is also stored at the end of the area corresponding to area 5 shown in FIG. 12. The charge monitoring circuit 50d of the tag device 50 also recharges the battery 50g using the power sent from the reader/writer 40-6. The reader/writer 40-6 also acquires the information stored in the tag device 50 and determines if the storage temperature is in the optimum temperature range of 12° C. to 14° C., and issues a warning, for example, that the temperature is not normal if the storage temperature is not in this range. This enables the consumer to know whether or not the storage conditions were normal up until when the consumer purchased the bottled wine 70. If the storage temperature is not normal, the product is not sold to the consumer.

If the storage temperature is determined to be normal, the pass check and temperature data acquired from the tag device 50 are saved in a database in the terminal device 30-6 and sent to the terminal device 30-5 and the host computer 10. The same data is then saved by the terminal device 30-5 and the host computer 10. The host computer 10 changes the pass check of area 6 to 1 in the distribution information shown in FIG. 13, and stores the measurement date/time information and the temperature data in the storage area corresponding to handling information area 5.

When reading/writing data by the reader/writer 40-6 is completed, the consumer consumes or stores the bottled wine 70 purchased from the retailer in the consumer's personal wine cellar (P15). This storage and consumption period is approximately one month in this example. While the wine is cellared, the tag device 50 switches from the sleep mode to the normal operating mode and acquires the temperature and time/date data at a frequency of once every 168 hours, and stores the acquired information in the storage area for area 6 in FIG. 12. If an abnormal temperature is detected, the abnormal temperature conditions are accurately recorded based on an interrupt from the temperature sensor 50k. By thus continuing to record temperature data after the product is purchased by the consumer, the retailer can determine whether or not the wine was stored properly by the consumer by reading the temperature data recorded by the tag device 50 if the consumer later makes a claim concerning the quality of the wine, and such claims can be handled appropriately.

It should be noted that the CPU 10e of the host computer 10 executes a process of tabulating data stored on the hard disk drive 10b at a specific frequency (such as once a day). More specifically, the CPU 10e tabulates for each product the total number produced, the number remaining in the distribution channel, and the number purchased by consumers, and stores the result in the hard disk drive 10b in a table such as shown in FIG. 15.

Figures 14, 15:
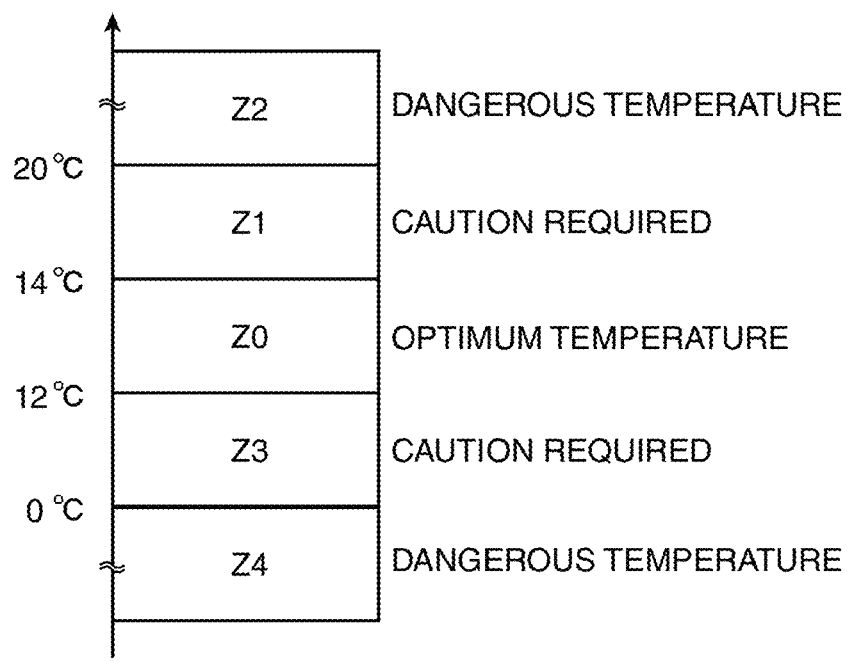
FIG. 14 describes the wine storage temperature.
FIG. 15 shows an example of data stored in the host computer.

In the example shown in FIG. 15 the CPU 10e determines the total production count from the number of records storing information for the product of product name "DEF" in the information shown in FIG. 13. The number remaining in the distribution channel can also be determined by referencing the distribution information shown in FIG. 13 and counting the number of records in which the pass check for area 6 is still set to 0. The number of bottles purchased by consumers can be determined by counting the number of records in which the pass check for area 6 is set to 1.

Displaying information related to the bottled wine 70 when the bottled wine 70 is displayed for sale in a retailer or purchased by a consumer is described next.

When a consumer purchases bottled wine 70 that is displayed for sale, the consumer may want to know about the authenticity or quality of the bottled wine 70. The consumer may also want to know about the quality of the bottled wine 70 sometime after purchasing the bottled wine 70. In such situations the retailer or consumer uses the terminal device 30-6 or terminal device 30-7 to start an application program for acquiring information stored on the host computer 10, and reads the information in the tag device 50 of the bottled wine 70 by means of reader/writer 40-6 or reader/writer 40-7.

For example, when the consumer reads the tag device 50 using the consumers own reader/writer 40-7, the stored information shown in FIG. 11A is read from the tag device 50 and sent to the host computer 10 through the terminal device 30-7.

The host computer 10 then reads the data corresponding to the received data from the hard disk drive 10b. To prevent access by anyone other than the owner of the bottled wine 70, a one-time password that is valid for only a short time (such as one minute), for example, may be used to allow access only when the one-time password is verified by the host computer 10. If the corresponding information is stored in the hard disk drive 10*b* of the host computer 10, the CPU 10*e* determines that the wine was produced by the proper manufacturer.

The CPU 10*e* then references the distribution information in the corresponding information found in the hard disk drive 10*b* and determines if all pass checks are set to 1. If all pass checks are set to 1, the CPU 10*e* determines that the product passed through the normal distribution channels. If the bottled wine 70 is still stocked by the retailer, the pass check for area 6 is still set to 0 and is ignored.

The CPU 10*e* then references the handling information in the corresponding information stored on the hard disk drive 10*b*, and determines if the temperature was properly managed during the distribution process up until then. If as a result an abnormal temperature is not detected, the CPU 10*e* determines that the wine was properly handled. Note that the information stored in the host computer 10 and the information stored in the tag device 50 may also be compared at this time to determine if the information matches. This method can prevent unauthorized access to the information through illicit means.

If all three of these decisions are cleared, the CPU 10*e* determines that the wine was produced by the correct manufacturer, distributed through the proper distribution channel, and handled properly, and sends a "certificate of wine quality" such as shown in FIG. 16A to the terminal device 30-7 for display on the display unit 30*f*.

In this sample display "Certificate of Wine Quality" is displayed as the title, and a message such as "the quality of this product is certified as follows" is displayed below the title. This is followed by information such as "Manufacturer: ABC," "Name of Product: DEF," "Produced At: ABC12345," and "Product Number: DEF54321."

Information may also be presented as shown in FIG. 16B, FIG. 16C, or FIG. 17A to FIG. 17C.

More particularly, in the example shown in FIG. 16B "Certificate of Wine Distribution" is displayed as the title, and a message such as "distribution of this product is certified as follows" is displayed below the title. This is followed by the name of each area 0 to area 5 (such as "ABC" for area 0) and the date and time that the wine passed that area.

In the example shown in FIG. 16C, "Certificate of Wine Handling" is displayed as the title, and a message such as "the storage and handling conditions of this product are certified as follows" is displayed below the title. This is followed by a graph showing the change in temperature in each area 0 to area 5 and a message such as "average storage temperature: 13.2° C."

In the sample display shown in FIG. 17A, "Wine Quality Information" is displayed as the title, and a message such as "information related to the quality of this wine is shown below" is displayed below the title. This is followed by information such as "Winter precipitation: 250 mm," "Average growing temperature: 24° C.," "Precipitation during harvest: 82 mm," "Alcohol: 14%," "Tannin: 7/10," and "Sugar: 5%."

In the sample display shown in FIG. 17B, "Wine Distribution Information" is displayed as the title, and a message such as "information related to the distribution of this wine is shown below" is displayed below the title. This is followed by information such as "Total bottles produced: 5632," "Bottles in distribution channel: 1233," "Bottles purchased by consumers: 1567," "Production number: 2343/5632," and a message such as "Current as of: 2009/4/20."

In the sample display shown in FIG. 17C, "Consumer Advice" is displayed as the title, and is followed by specific advice such as "* This wine was bottled four months ago and should be best to drink in the beginning of next month," "* Best matched with sauteed veal," and "* Optimum storage temperature: 12° C. to 14° C."

By referencing information such as described above, the consumer can know that the bottled wine 70 was produced by the stated manufacturer, shipped through the normal distribution channels, and was stored under the proper temperature conditions.

Furthermore, because the consumer can also get information related to the wine quality, information about how much of the wine has been distributed, and advice related to the particular wine, the consumer can be better informed about the bottled wine 70. More particularly, because the number of bottles produced and the number of bottles distributed are important factors affecting the price of high end wines, this information can be used by the consumer when deciding how to consume the wine, such as whether to consume the wine with family only or to consume the wine at a party or other venue with important friends and colleagues.

B-3 Processes Executed by the Terminal Devices and Host Computer

Figure 18:
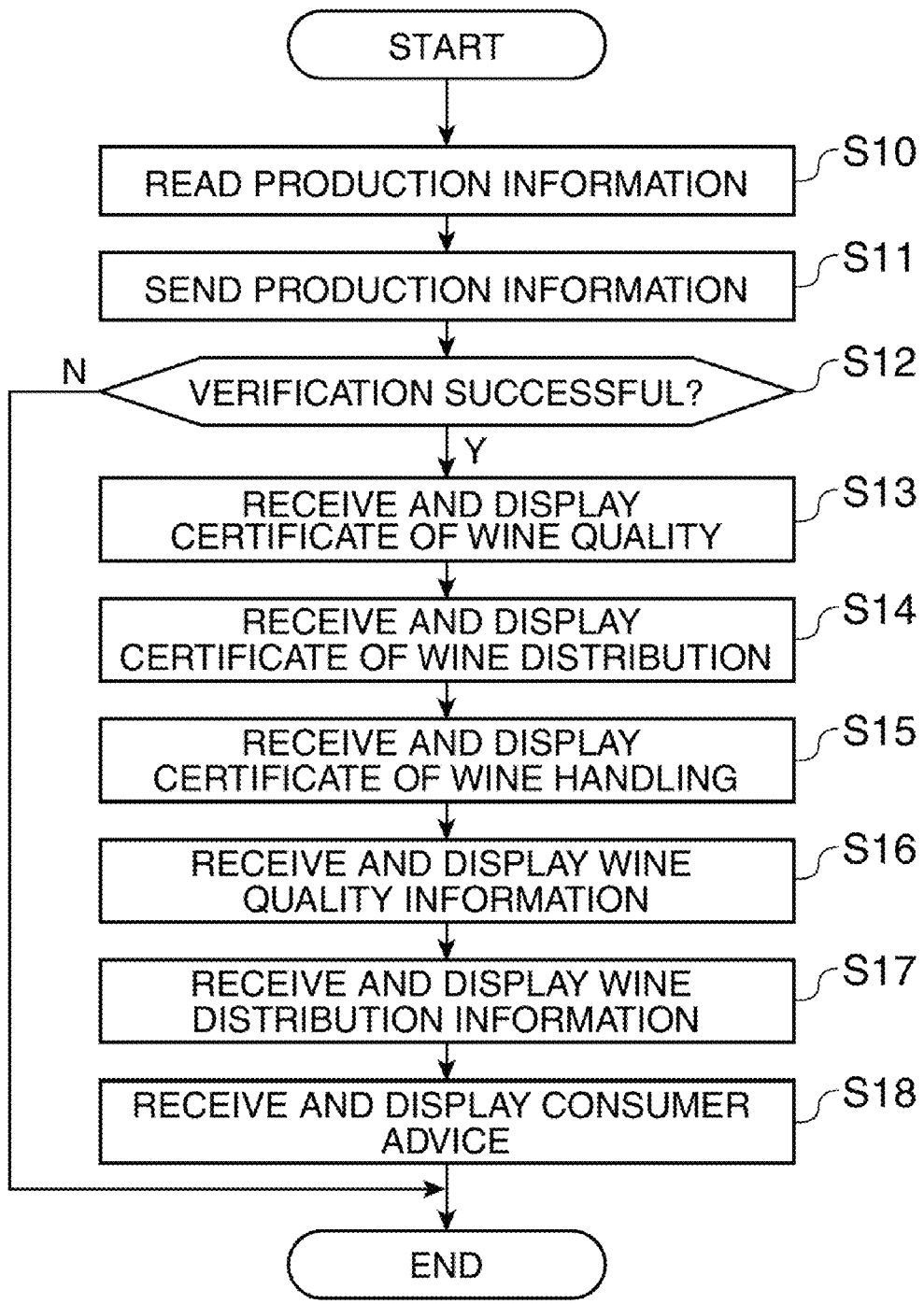
FIG. 18 is a flow chart describing a process executed by the terminal device.
Figure 19:
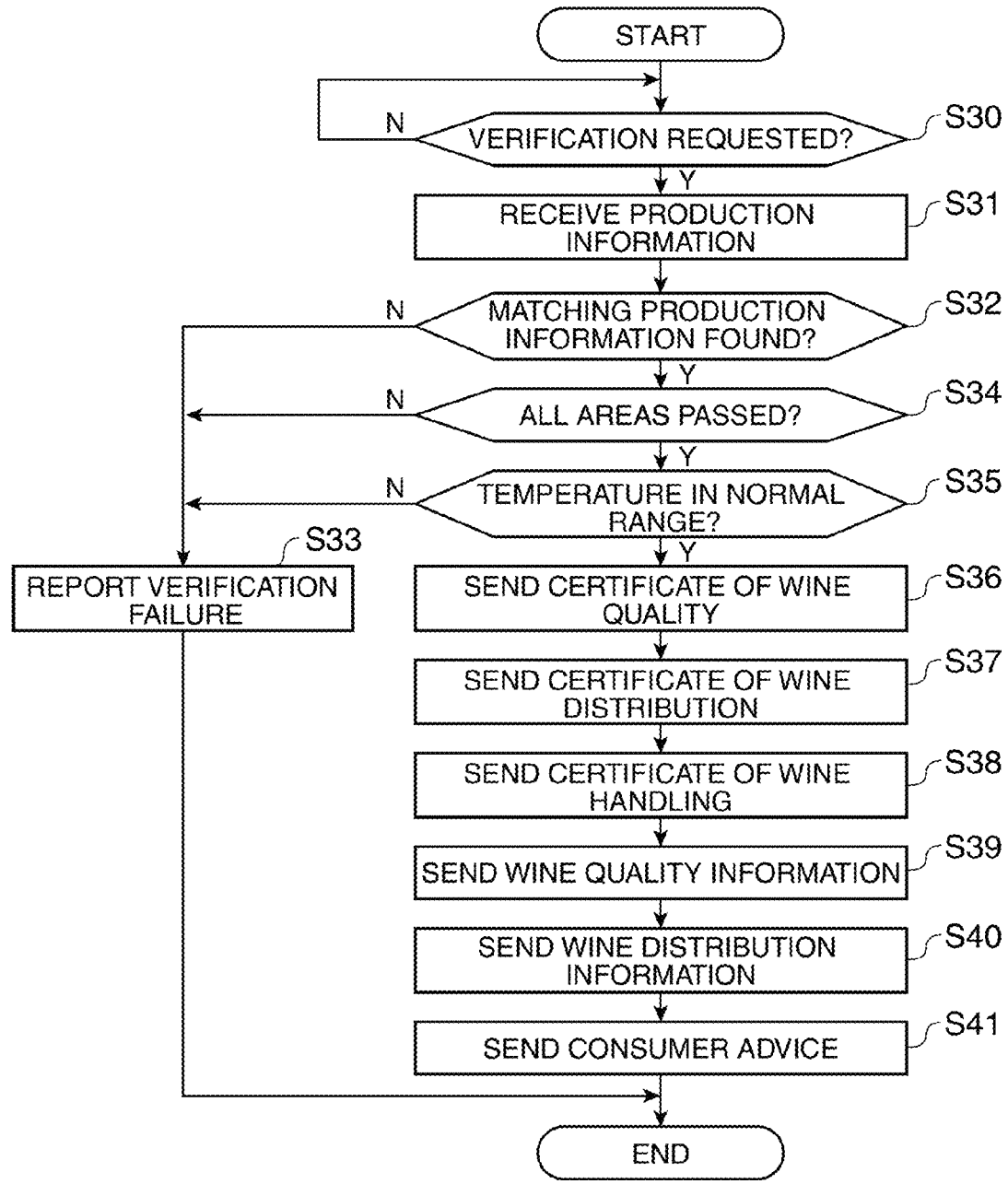
FIG. 19 is a flow chart describing a process executed by the host computer.

FIG. 18 is a flow chart of an exemplary process executed by the terminal device 30-6 or terminal device 30-7, and FIG. 19 is a flow chart of an exemplary process executed by the host computer 10.

When the process shown in FIG. 18 starts, the CPU 30*e* reads the production information from the tag device 50 through the reader/writer 40 in step S10. In step S11 the CPU 30*e* then sends the acquired production information over the network 20 to the host computer 10 and requests verification. This causes the host computer 10 to execute the verification process, determine the validity of the producer, distribution process, and handling conditions, and if all of these conditions are valid sends a verification success report to the terminal device 30.

The CPU 30*e* determines in step S12 if verification was successful, proceeds to step S13 if verification was successful (step S12 returns Yes), and otherwise (step S12 returns No) ends processing.

In step S13 the CPU 30*e* receives a wine quality certificate from the host computer 10 and displays the certificate on the display unit 30*f*. As a result, information such as shown in FIG. 16A is displayed on the display unit 30*f*. Note that this information is generated based on the production information shown in FIG. 13.

In step S14 the CPU 30*e* receives a wine distribution certificate from the host computer 10 and displays the certificate on the display unit 30*f*. As a result, information such as shown in FIG. 16B is displayed on the display unit 30*f*. Note that this information is generated based on the distribution information shown in FIG. 13.

In step S15 the CPU 30*e* receives a wine handling certificate from the host computer 10 and displays the certificate on the display unit 30*f*. As a result, information such as shown in FIG. 16C is displayed on the display unit 30*f*. Note that this information is generated based on the handling information shown in FIG. 13.

In step S16 the CPU 30*e* receives the "wine quality information" from the host computer 10 and displays the information on the display unit 30*f*. As a result, information such as shown in FIG. 17A is displayed on the display unit 30*f*. Note that this information is generated based on the data corresponding to the file name stored in the quality information shown in FIG. 13.

In step S17 the CPU 30e receives the "wine distribution information" from the host computer 10 and displays the information on the display unit 30f. As a result, information such as shown in FIG. 17B is displayed on the display unit 30f. Note that this information is generated based on the data shown in FIG. 15.

In step S18 the CPU 30e receives the "consumer advice" from the host computer 10 and displays the information on the display unit 30f. As a result, information such as shown in FIG. 17C is displayed on the display unit 30f. Note that this information is generated based on the data corresponding to the file name stored in the advice information shown in FIG. 13.

The process executed by the host computer 10 is described next with reference to FIG. 19.

When the process shown in FIG. 19 starts the CPU 10e determines whether or not a verification request was received from a terminal device 30 in step S30. If a request was received (step S30 returns Yes), the CPU 10e proceeds to step S31, and otherwise (step S30 returns No) repeats the same step.

In step S31 the CPU 10e receives the production information from the terminal device 30.

In step S32 the CPU 10e determines if the corresponding production information (the information shown in FIG. 13) is stored on the hard disk drive 10b, proceeds to step S34 if the requested production information is found (step S32 returns Yes), and otherwise (step S32 returns No) proceeds to step S33.

In step S33 the CPU 10e informs the terminal device 30 that verification failed. This causes the terminal device 30 to return No in step S12.

In step S34 the CPU 10e references the distribution information stored on the hard disk drive 10b, and proceeds to step S35 if the queried bottled wine 70 has passed through all stages of the distribution process (step S34 returns Yes). Otherwise (step S34 returns No), the CPU 10e goes to step S33.

In step S35 the CPU 10e references the handling information stored in the hard disk drive 10b, and proceeds to step S36 if the queried bottled wine 70 was stored under the proper temperature conditions at all stages of the distribution process (step S35 returns Yes). Otherwise (step S35 returns No), the CPU 10e goes to step S33.

In step S36 the CPU 10e sends the wine quality certificate generated based on the production information to the terminal device 30. As a result, the wine quality certificate shown in FIG. 16A is displayed on the display unit 30f of the terminal device 30.

In step S37 the CPU 10e sends the wine distribution certificate generated based on the distribution information to the terminal device 30. As a result, the wine distribution certificate shown in FIG. 16B is displayed on the display unit 30f of the terminal device 30.

In step S38 the CPU 10e sends the wine handling certificate generated based on the handling information to the terminal device 30. As a result, the wine handling certificate shown in FIG. 16C is displayed on the display unit 30f of the terminal device 30.

In step S39 the CPU 10e sends the wine quality information generated based on the data corresponding to the file name shown in the quality information to the terminal device 30. As a result, the wine quality information shown in FIG. 17A is displayed on the display unit 30f of the terminal device 30.

In step S40 the CPU 10e sends the wine distribution information generated based on the information shown in FIG. 15 to the terminal device 30. As a result, the wine distribution information shown in FIG. 17B is displayed on the display unit 30f of the terminal device 30.

In step S41 the CPU 10e sends the consumer advice information generated based on the data corresponding to the file name shown in the advice information to the terminal device 30. As a result, the consumer advice information shown in FIG. 17C is displayed on the display unit 30f of the terminal device 30.

When the retailer or consumer operates a terminal device 30 and reads the information recorded in a tag device 50 affixed to a bottle of wine 70 by means of a reader/writer 40, whether or not the bottled wine 70 is authentic is determined by the host computer 10. Because information related to the queried bottled wine 70 is displayed only if the bottle is determined to be authentic, the information recorded on the tag device 50 can be used effectively and the authenticity of the bottled wine 70 can be known.

Furthermore, because product validity is assured only if the producer, distribution steps, and handling conditions are good, assuring the authenticity of products that should be removed from distribution can be prevented. Because product validity is not assured when bottled wine that should be removed from distribution is sold illicitly, that the sale is illicit can be known.

Furthermore, because products that require careful quality control can be assured of being offered for sale only when the producer, distribution process, and handling conditions are all correct, trust in the products that are sold in the course of regular business can be reliably protected.

Furthermore, because information related to production conditions is presented when product validity is verified, the embodiment described above can provide valuable information related to the production conditions to the consumer that buys the product.

In addition, because information relating to how much of a particular product is still in distribution can be provided when product validity is verified, product value can be enhanced by showing the rarity of the product to the consumer purchasing the product.

Yet further, because information related to the consumption period can be provided when the product validity is verified, the consumer can be prompted to consume the wine when the wine is best by, for example, presenting information related to when the wine should be best to drink to the consumer that purchased the wine.

C. Other Embodiments

It will be obvious to one with ordinary skill in the related art that the foregoing embodiment describes only one possible embodiment of the invention, and can be varied in many ways without departing from the scope of the accompanying claims.

For example, the embodiment described above has one host computer 10 and eight terminal devices 30-0 to 30-7 and reader/writers 40-0 to 40-7, but the invention is not limited to these numbers.

Furthermore, the distribution process is described using five sites as shown in FIG. 10, but other distribution stages may also be included. There may also be fewer distribution steps.

Two types of data, time/date information and temperature data, are recorded to the nonvolatile memory 50i in the foregoing embodiment, but other information may be included. More specifically, a barometric sensor, humidity sensor, inclination sensor, impact sensor, or light sensor, for example, may be provided, and the data collected by these devices may be recorded in the nonvolatile memory 50i. By providing such sensors it can be known if, for example, the bottled wine was subjected to pressure other than normal pressure and leaked, if the humidity dropped to less than the optimal humidity of 70% and the cork deteriorated, if the bottle was tilted and the cork is not wet, if the bottle was subject to a hard impact, or if the wine was exposed to more light than necessary.

Bottled wine is also used by way of example as the product to which the tag device 50 is disposed, but the invention is not so limited and the tag device 50 may be used with other types of products.

The tag device 50 is described in the foregoing embodiment as refusing access when access is attempted by a device other than an authorized reader/writer, but the CPU 50f may automatically delete the information stored in nonvolatile memory 50i when unauthorized access is attempted. This method can reliably protect information from improper access.

The foregoing embodiment reads the information stored in the tag device 50 by means of a reader/writer 40 and asks the host computer 10 for verification. Alternatively, a display device may be disposed to the tag device 50 or a display device may be made connectable to the tag device 50, said display device may display the information stored on the tag device 50, and the displayed information may be input from the input unit 30c of the terminal device.

Further alternatively, a linear or two-dimensional bar code may be generated based on the information stored in the tag device 50, and the displayed barcode may be read by a terminal device. When the read information is sent from the reader/writer 40 to the host computer 10, data confidentiality may be improved by, for example, inputting the data together with a password and the host computer 10 also verifying the password. In this situation a password may, for example, be previously stored in the ROM 50b of the tag device 50, and this password may be used or a password received from the producer side may be given to the consumer when the consumer buys the product from the retailer. Alternatively, a one-time password generator may be provided to the consumer and the password generated by the one-time password generator may be used for verification.

The foregoing embodiment has been described using an individual as the end consumer by way of example, but when the operator of a restaurant, for example, supplies the wine to a customer, the information shown in FIG. 16 and FIG. 17 could be displayed on the display unit 30f by the sommelier, for example, reading the tag device 50 affixed to the wine with the reader/writer 40. Satisfaction commensurate to the price of a luxury wine can thus be provided.

What happens after the consumer consumes the wine is not described in the foregoing embodiment. However, after the consumer consumes the wine, the empty bottle may be recycled by a shipping company, for example, and returned to the manufacturer. With this method the tag device 50 and the bottle can be reused. When the bottle is recycled, the information recorded in the tag device 50 can be acquired and sent to the host computer 10 by the reader/writer and reflected in the information shown in FIG. 15 so that the number of bottles possessed by consumers can be accurately counted.

Protection of the information stored in the nonvolatile memory 50i can also be strengthened by rendering the tag device 50 with a tamper-resistant construction. More specifically, the tag device 50 may be rendered so that if the protective layer in which the circuits of the tag device 50 shown in FIG. 5 are sealed is destroyed, the circuits or circuit patterns are simultaneously destroyed. Because this makes destroying the protective layer and analyzing the internal circuits impossible, protection of information stored in the nonvolatile memory 50i can be further strengthened.

Furthermore, because the information shown in FIG. 9A is not overwritten when the product is shipped, illicit modification can be prevented by recording the information on a ROM 40b device that cannot be rewritten instead of in nonvolatile memory 50i.

The tag device 50 is disposed to the bottom part of a bottle 71, 81 in the foregoing embodiment, but the tag device 50 may be disposed inside the cork stopper 72, 82, on the back side of a label, or on the surface of the bottle 71, 81.

Furthermore, a contactless tag device is described by way of example in the foregoing embodiments, but the invention can also be used with contact tag devices.

The invention having been thus described, variations and modifications will be apparent to those skilled in the art in light of the foregoing disclosure. Each such variation and modification is regarded as within the spirit and scope of the invention to the extent that it falls within any of the following claims.

What is claimed is:

1. A product information management system, comprising:
    a reader/writer associated with each of a plurality of distribution steps through which a product to which a tag device is disposed is distributed, wherein information indicating passage through each distribution step is written to the tag device by the reader/writer associated with that distribution step;
    a server device that records information related to the product; and
    a terminal device that acquires and presents information recorded on the server device;
    the terminal device including
        an input receiving unit that accepts input of information recorded on the tag device,
        a query unit that sends information input through the input receiving unit to the server device and requests verification of the validity of the product, and
        a presentation unit that presents information that is transmitted when the validity of the product is verified by the server device; and
    the server device including
        a recording unit that records information related to the product,
        a verification unit that determines validity based on information sent from the terminal device when the terminal device requests verification of product validity, and
        a transmission unit that acquires and sends the corresponding information recorded in the recording unit to the terminal device when validity is verified by the verification unit;
    wherein server device causes the presentation unit of the terminal device to present information related to the product when verification of validity is successful based on information indicating passage through each distribution step.

2. The product information management system described in claim 1, wherein:
    information unique to each product is written to the tag device by a manufacturer during product manufacture, and
    the server device provides information related to the product to the presentation unit of the terminal device when verification of validity is successful based on information unique to each product.

3. The product information management system described in claim 2, wherein:
the server device provides information related to production conditions of the product to the presentation unit of the terminal device when verification of validity is successful based on information unique to each product.

4. The product information management system described in claim 2, wherein:
the server device causes the presentation unit of the terminal device to present information indicating a quantity of products of the same type in the distribution channel when verification of validity is successful based on information indicating passage through each distribution step.

5. The product information management system described in claim 1, wherein:
the tag device records information related to an environment in which the product is placed; and
the server device causes the presentation unit of the terminal device to present information related to the product when verification of validity is successful based on information related to the environment.

6. The product information management system described in claim 5, wherein:
the server device produces information related to a consumption time of the product based on information related to the environment and causes the presentation unit of the terminal device to present information related to the consumption time when verification of validity is successful based on information related to the environment.

7. The product information management system described in claim 1, wherein:
the product is wine; and
the server device causes the presentation unit of the terminal device to present information related to the product when a producer of the wine, distribution process, and handling conditions are valid.

8. The product information management system described in claim 1, wherein:
the input receiving unit is the reader/writer and reads information stored in the tag device.

9. The product information management system described in claim 1, wherein:
the tag device can display stored information on a display device; and
information displayed on the display device or information generated based on said information is input to the input receiving unit.

10. A product information management method for a product information management system having a server device that records information related to a product to which a tag device is disposed, and a terminal device that acquires and presents information recorded on the server device, comprising:
writing information indicating passage through each of a plurality of distribution steps to the tag device by a reader/writer, one associated with each distribution step;
the terminal device having
an input step of accepting input of information recorded on the tag device,
a query step of sending information input in the input step to the server device and requests verification of the validity of the product, and
a presentation step of presenting information that is transmitted when the validity of the product is verified by the server device; and
the server device having
a recording step of recording information related to the product in a recording device,
a verification step of determining validity based on information sent from the terminal device when the terminal device requests verification of product validity,
a transmission step of acquiring and sends the corresponding information recorded in the recording unit to the terminal device when validity is verified in the verification step, and
a step of causing the terminal device to present information related to the product when verification of validity is successful based on information indicating passage through each distribution step.

11. The product information management method described in claim 10, wherein:
information unique to each product is written to the tag device by a manufacturer during product manufacture, and
the server device has a step of providing information related to the product to the terminal device when verification of validity is successful based on information unique to each product.

12. The product information management method described in claim 11, wherein:
the server device has a step of providing information related to production conditions of the product to the terminal device when verification of validity is successful based on information unique to each product.

13. The product information management method described in claim 10, wherein:
the server device has a step of causing the terminal device to present information indicating a quantity of products of the same type in the distribution channel when verification of validity is successful based on information indicating passage through each distribution step.

14. The product information management method described in claim 10, wherein:
the tag device records information related to an environment in which the product is placed; and
the server device has a step of causing the terminal device to present information related to the product when verification of validity is successful based on information related to the environment.

15. The product information management method described in claim 14, wherein:
the server device has a step of producing information related to a consumption time of the product based on information related to the environment and causing the terminal device to present information related to the consumption time when verification of validity is successful based on information related to the environment.

* * * * *